US008769768B2

(12) United States Patent
Laliberté et al.

(10) Patent No.: US 8,769,768 B2
(45) Date of Patent: Jul. 8, 2014

(54) LID WITH A CURVED EDGE AND DOMED AIR OUTLETS FOR THE COLLECTION OF LEAVES WITH A BLOWER/VACUUM AND THE REJECTION OF DEBRIS INTO A BAG

(76) Inventors: William Laliberté, Québec (CA); Denis Laliberté, Québec (CA)

( * ) Notice: Subject to any disclaimer, the term of this patent is extended or adjusted under 35 U.S.C. 154(b) by 222 days.

(21) Appl. No.: 13/561,001

(22) Filed: Jul. 28, 2012

(65) Prior Publication Data
US 2013/0333138 A1 Dec. 19, 2013

(30) Foreign Application Priority Data
Jun. 15, 2012 (CA) ..................................... 2780100

(51) Int. Cl.
*A47L 5/28* (2006.01)
(52) U.S. Cl.
USPC ............................. 15/347; 15/327.2; 15/246.2
(58) Field of Classification Search
USPC ........ 15/246.2, 352, 347, 327.2; 55/428, 429, 55/467
IPC .............................. A47L 5/28,9/10; B01D 45/18
See application file for complete search history.

(56) References Cited

U.S. PATENT DOCUMENTS

| 4,691,840 | A | * | 9/1987 | Ferbrache | 220/318 |
| 4,723,971 | A | * | 2/1988 | Caldas | 96/385 |
| 6,170,118 | B1 | * | 1/2001 | McIntyre et al. | 15/327.6 |
| 6,574,829 | B1 | * | 6/2003 | Marcum et al. | 15/347 |
| 6,988,293 | B2 | * | 1/2006 | Ritter | 15/347 |
| 7,185,389 | B2 | * | 3/2007 | Thomason et al. | 15/246.4 |
| 7,257,858 | B2 | * | 8/2007 | Palazzolo | 15/347 |
| 7,341,612 | B2 | * | 3/2008 | Nhan et al. | 55/373 |
| 7,506,403 | B2 | * | 3/2009 | Svoboda et al. | 15/347 |
| 7,587,785 | B2 | * | 9/2009 | Arner | 15/327.5 |
| 7,752,706 | B2 | * | 7/2010 | Goodger | 15/327.4 |
| 7,917,992 | B2 | * | 4/2011 | McIntyre | 15/327.1 |
| 7,962,996 | B1 | * | 6/2011 | Mondello | 15/347 |

* cited by examiner

*Primary Examiner* — David Redding

(57) ABSTRACT

A lid round in shape with a curved edge and two domed air outlets, an opening for the entrance of debris, a handle, elevations molded to hold the various elements and sections of rough anti-skid tape glued to the side wall. The lid with curved edge is designed to be inserted into the opening of a bag to be held in place on the side edge of the lid with an elastic cord between the curved edge and the elevations. Ribbed connecting pipe connects the fan outlet of a blower/vacuum in vacuum mode to the lid and carries the leaves debris toward the lid and into a bag.

70 Claims, 20 Drawing Sheets

LID WITH A CURVED EDGE AND DOMED AIR OUTLETS FOR THE COLLECTION OF LEAVES WITH A BLOWER/VACUUM AND THE REJECTION OF DEBRIS INTO A BAG

TECHNICAL FIELD

The present invention relates to a lid with a curved edge and domed air outlets for the collection of leaves with a portable blower/vacuum in vacuum mode for the aspiration and the shredding of leaves and the rejection of debris into a bag.

BACKGROUND OF THE INVENTION

The blower/vacuums are well known in lawn and garden implement which are used for blowing or picking up various debris, such as leaves and grass clippings. A typical blower/vacuum in suction mode comprises a housing that encloses an electric motor having a rotatable shaft on which is connected a fan placed in a housing. During the rotation of the motor, the fan mounted on the shaft rotates and creates a suction which draws the leaves and other lawn debris into the fan inlet where they are shredded and then ejected from the fan outlet. A handle is provided on the housing to allow the user to hold and direct the inlet of the blower/vacuum. In the mode normally used, the blower/vacuum rejects debris in a small collection bag coupled directly to the fan outlet of the blower/vacuum. The user wears on his shoulder the debris collection bag with a belt attached to the bag. The weight of the debris that accumulates in the bag creates in time some fatigue at the user. When the collection bag is full, the user disconnects the collection bag from the fan outlet of the blower/vacuum, unzips a zipper provided in the bag, and then dumps the debris out of the bags into a larger disposable bag to collect debris, a trash can or a place for decomposing debris. The user can then close the collection bag with the zipper, connects it to the blower/vacuum and continue to collect debris. This type of debris collection bag, although effective for collecting small amounts of debris, quickly becomes limiting for the collection of large amounts of debris. It must frequently be emptied what becomes tedious and slows significantly the work of the user. In addition to the weight of the bag and debris, the bag being suspended from the user's body, the dust emitted by the air output through the bag pores can be annoying to users.

Other debris collection systems were invented to correct problems of the conventional system described above. U.S. Pat. No. 7,506,403 B2 has a collection bag in a cart with wheels, the bag must be emptied when full and the system is designed for one type of bag. The user also has the disadvantage to pull a wagon wheel with the bag of debris. U.S. Pat. No. 7,587,785 B2, the user wears on his back the receptacle to collect the debris and debris must be emptied in a bag for disposal. For the U.S. Pat. No. 6,988,293 B2, leaves are collected directly in a bag with slots to the air outlet, the bag is disposable which eliminates the need to pour the debris and the bag is designed specifically for the system. The bag is attached to the blower/vacuum and the weight of the bag and debris is carried by the user. It is not possible to use a wide variety of bags to collect debris which limits the choice of supplier. The bag is of small dimensions compared to the collection bag for lawn debris. For U.S. Pats. No. 7,962,996 B1, 7,917,992 B2 and 7,752,706 B2, the debris is collected in a large collection bag inserted into a large solid container mounted on a cart. The cart can be moved and carries the weight of debris. This system is relatively heavy and large. It can be cumbersome to move over rough terrain. The user must move the cart as the work progresses. For U.S. Pat. Nos. 7,257,858 B2, 6,574,829 B1 and 4,713,858, the debris collection system is maintained by a support frame made of metal or a metal container. Debris is collected in a large bag. These systems are fixed and the leaves must be near the system to be collected. The user cannot easily move the system in use. For U.S. Pat. Nos. 7,341,612 B2, 7,185,389 B2 and 4,723,971, the debris is sucked into a small bag or into a rigid container without being shredded first requiring much more space for storage. In addition, the materials must be small as dust or sawdust, and it is little suitable for collection of whole leaves. The system moves on casters or wheels which can pose a problem when the ground is uneven. A single bag model can be used.

Accordingly, it is necessary in the art of collecting debris to have a debris collection system allowing both the user mobility and the collection of large amounts of debris without having to pour debris in another bag or requiring the user to carry the bag of debris. Similarly, it is also necessary to have a versatile system that can use a wide variety of bags sold by different companies for the collection of debris to reduce the cost of buying bags and therefore storage costs of debris.

In the art of debris collection, the debris is usually kept in bags placed in metal containers or plastic which is covered with a lid to prevent odors or protect them from weather. These lids are often round in shape and slightly curved. These lids are designed to be watertight and airtight for the needs they are intended. One of these types of lid has a groove on the side wall. U.S. Pat. Nos. 4,691,840, 5,163,577, 5,085,340, 5,160,060, U.S. Des. 326,342 and CA 2542229 refer to this type of lid. The company Rubbermaid Canada, Mississauga, Ontario, sells this type of container with lid for collecting debris. These lids do not have a top opening, which removes the possibility of inserting debris into containers or bags inside the containers other than removing the container lid.

Accordingly, as this type of lid round in shape and having both a groove on the side wall, openings for the air outlet and an opening for the discharge of lawn debris directly into a collecting bag using a blower/vacuum in suction mode, does not exist, Laliberté, W. and D. Laliberté, 2011, in the patent application CA 2,748,583 (U.S. Ser. No. 13/539,322), have invented a type of lid adapted to this need. They also presented the possible modifications to existing lids using their invention to allow their use with the collection system described in their patent application. For a good understanding of the present patent application and its usefulness, the authors recommend first checking the patent application CA 2,748,583 (U.S. Ser. No. 13/539,322).

The type of lid stated in the patent application CA 2,748,583 (U.S. Ser. No. 13/539,322) from Laliberté, W. and D. Laliberté, 2011, with a groove on the side to hold the bag up around the lid with a bungee cord, although very effective, application technique molding plastics is more expensive than the manufacturing technical plastic injection. Indeed, the presence of the groove on the side does not allow the use of the technique of injection molding, which is better suited for producing large quantities with the lowest costs per lid.

This is to reduce production costs inherent in this type of lid that a new type of lid without groove, but with a curved edge to the outside, was designed to be manufactured by plastic injection molding. This type of lid is described in patent application CA 2,764,509 (U.S. Ser. No. 13/555,147) from Laliberté, W. and D. Laliberté, 2012.

However, in this type of lid the different elements are attached to the lid with flexible cable ties which require a relatively long manual assembly. In order to reduce production costs of this type of lid, modifications have been made to create a new type of lid. The modifications allow the lid to mold simultaneously with the air outlets (that have a domed top), a handle, hooks to hold strainers, a hook to hold the elbow to the entrance of debris, the elevations on the outer wall to hold the elastic cord. Also the two 45 degree elbows used for the entrance of debris have been replaced by a 90 degree elbow with an elevation around the female part.

Changes are also made to the lid from the patent application CA 2,764,509 (U.S. Ser. No. 13/555,147) from Laliberté, W. and D. Laliberté, 2012, by adding a new type of elbow to deflect the air, a new kind of elevations glued on the wall between band sections of anti-skid tape, by using a 90 degree elbow at the entrance of debris and by using a new type of fastener for holding the strainers. These modifications are intended to facilitate the assembly of various components onto the lid and to improve appearance.

SUMMARY OF THE INVENTION

The new type of lid with its various elements is made of molded plastic and is designed for use with the debris collection system with a portable blower/vacuum for rejection and retention of debris in a bag described in patent applications CA 2,748,583 (U.S. Ser. No. 13/539,322) from Laliberté, W. and D. Laliberté, 2011, and CA 2,764,509 (U.S. Ser. No. 13/555,147) from Laliberté, W. and D. Laliberté, 2012.

The lid is round in shape, preferably with a flat or slightly domed top. The top of the lid has two rectangular openings for air outlet with top and back domed, a handle, an opening for the entrance of debris, which is partly round with a U-shaped flared extension whose base is directed towards the center of the lid. This opening, in which the U is shorter than in the application CA 2,764,509 (U.S. Ser. No. 13/555,147), allows the insertion through the lid of a 90 degree elbow with an inclination angle of about 10 degrees to the underside of the lid. Two holes are located on either side of this opening to hold the ribbed coupling pipe to the lid in which is inserted the ribbed connecting pipe carrying the debris. In addition, the lid on the inside has six hooks to hold the two strainers and another hook to hold the 90 degree elbow. The lid wall is inclined outwardly to facilitate the movement of waste to the debris collection bag. The lid has a curved edge bent in a U shape consisting of the side wall of the lid and the curvature of the extension of the latter bent towards the outside of the lid. Inside the U, at regular intervals, are side reinforcements to give more rigidity to the lid. Four elevations are placed near the lower limit of the curved edge to hold the elastic cord. At the lower limit of the curved edge, between the elevations, are placed rough adhesive anti-skid tape sections to increase the coefficient of friction between the lid wall and the debris collection bag. The elevations and the rough anti-skid tape sections are used to maintain the bag in place around the lid when the elastic cord is placed over the bag at this location.

The main advantage of the lid with curved edge and domed air outlet is that it can be produced in large quantities at lower cost than the types of lids described in the applications CA 2,748,583 (U.S. Ser. No. 13/539,322) from Laliberté, W. and D. Laliberté, 2011, and CA 2,764,509 (U.S. Ser. No. 13/555,147) from Laliberté, W. and D. Laliberté, 2012.

The lid with curved edge and domed air outlet has dimensions similar to those with a groove on the side or with curved edge and can replace them in the debris collection system described in patent applications CA 2,748,583 (U.S. Ser. No. 13/539,322) from Laliberté, W. and D. Laliberté, 2011, and CA 2,764,509 (U.S. Ser. No. 13/555,147) from Laliberté, W. and D. Laliberté, 2012.

The lid with curved edge and domed air outlets has the same efficiency for air circulation and retention of debris within the lid and the debris collection bag.

The lid with curved edge and domed air outlets retains the debris collection bag on its circumference as well as the lids with a groove or curved edge.

The lid with curved edge and domed air outlets allows for easy installation and easy release of the debris collection bag around its perimeter by installing and removing the bungee cord.

The lid with curved edge and domed air outlets has all the advantages of the lids with groove on the side or with curved edge described and claimed in the patent applications CA 2,748,583 (U.S. Ser. No. 13/539,322) from Laliberté, W. and D. Laliberté, 2011, and CA 2,764,509 (U.S. Ser. No. 13/555,147) from Laliberté, W. and D. Laliberté, 2012. To read about all these advantages, the reader is referred to the said patent applications; which would be too long to enumerate here.

BRIEF DESCRIPTION OF THE DRAWINGS

This invention will be described in more detail in the following description taken in conjunction with the following drawings, wherein like reference numbers indicate like elements throughout.

DETAILED DESCRIPTION OF THE PREFERRED EMBODIMENTS

Figure 1:
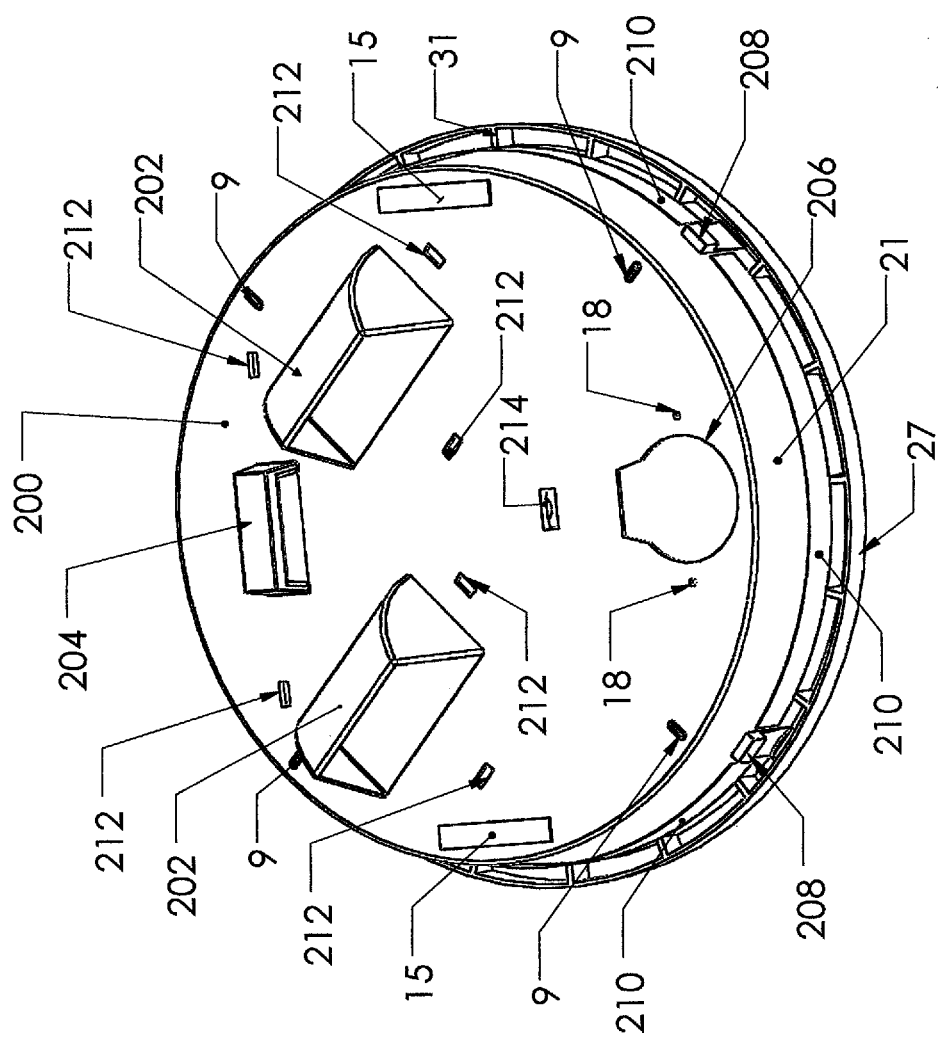
FIG. 1 is a perspective view of the top of the first preferred embodiment of the lid with curved edge and domed air outlets.

FIG. 1 shows a perspective view of the top of the first preferred embodiment of the lid with curved edge and domed air outlet of the present invention, including the lid 200 of round shape with preferably a flat top and with the side wall slightly inclined.

Figure 5:
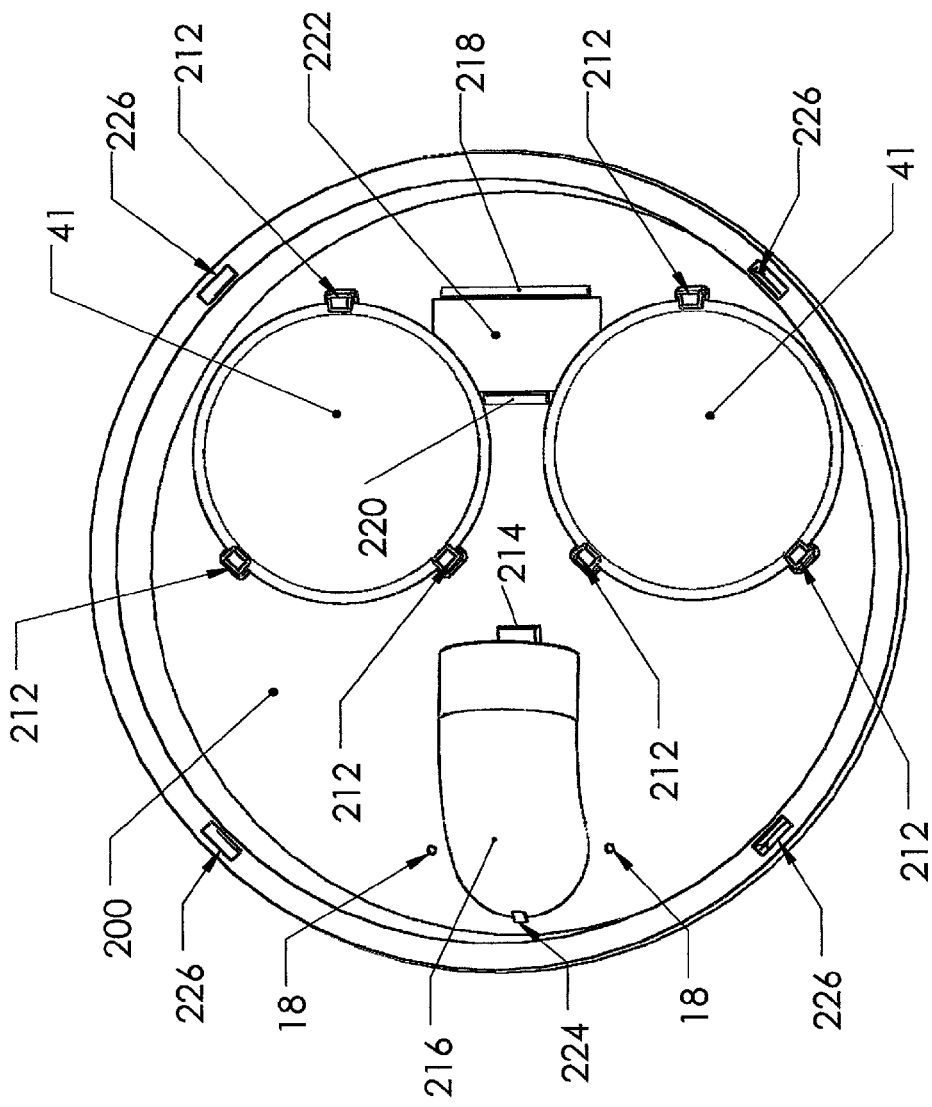
FIG. 5 is an underside view of the first embodiment of the lid with curved edge and domed air outlets with the strainers and the 90 degree elbow for the entrance of debris.
Figure 11:
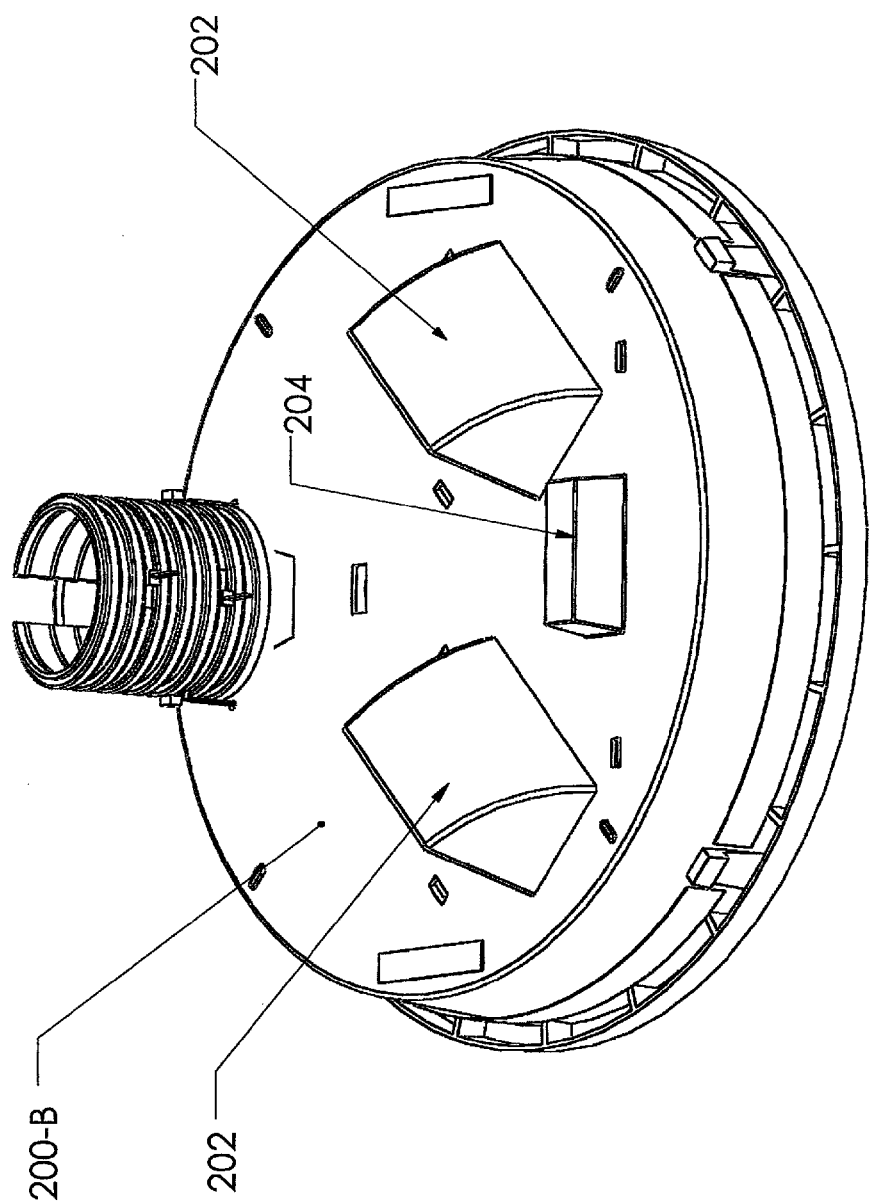
FIG. 11 is perspective view of the top of the second embodiment of the lid with curved edge and domed air outlets oriented to the left.
Figure 12:
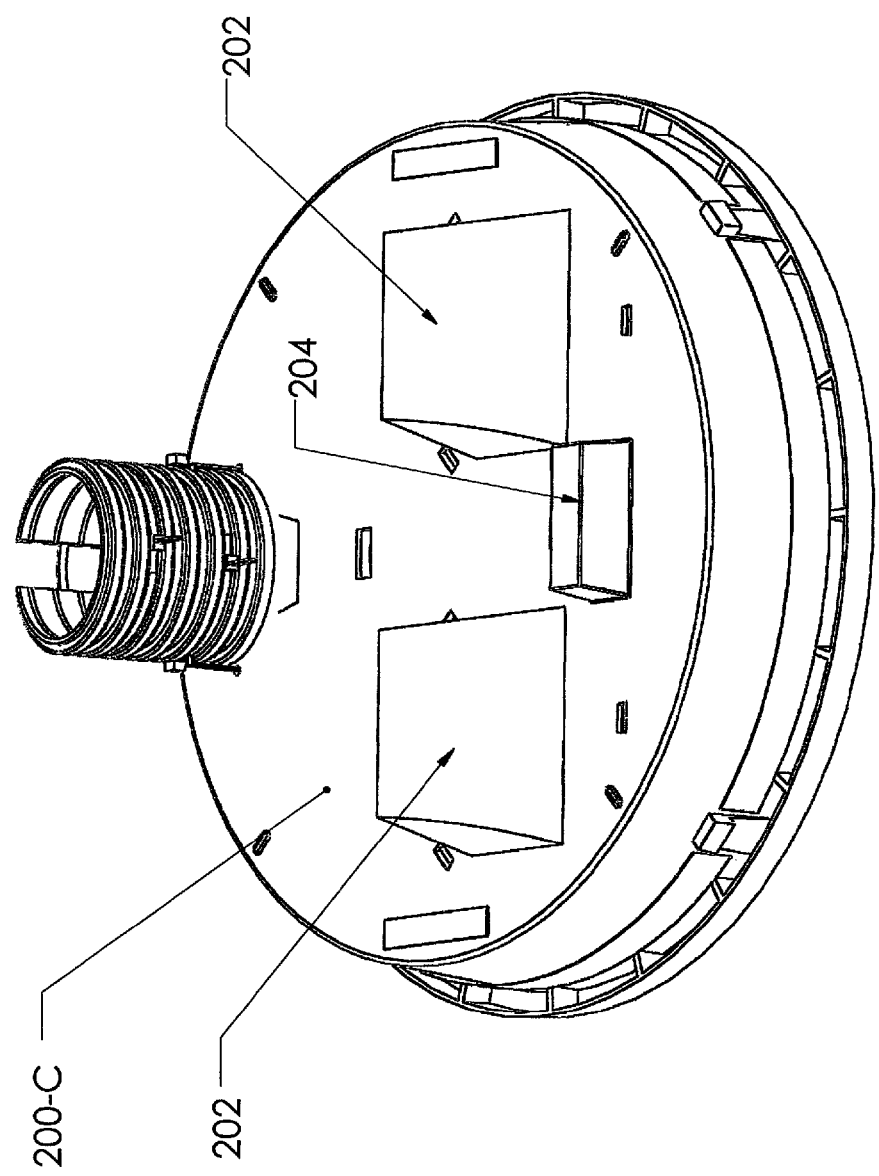
FIG. 12 is a perspective view of the top of the third embodiment of the lid with curved edge and domed air outlets towards the center.
Figure 13:
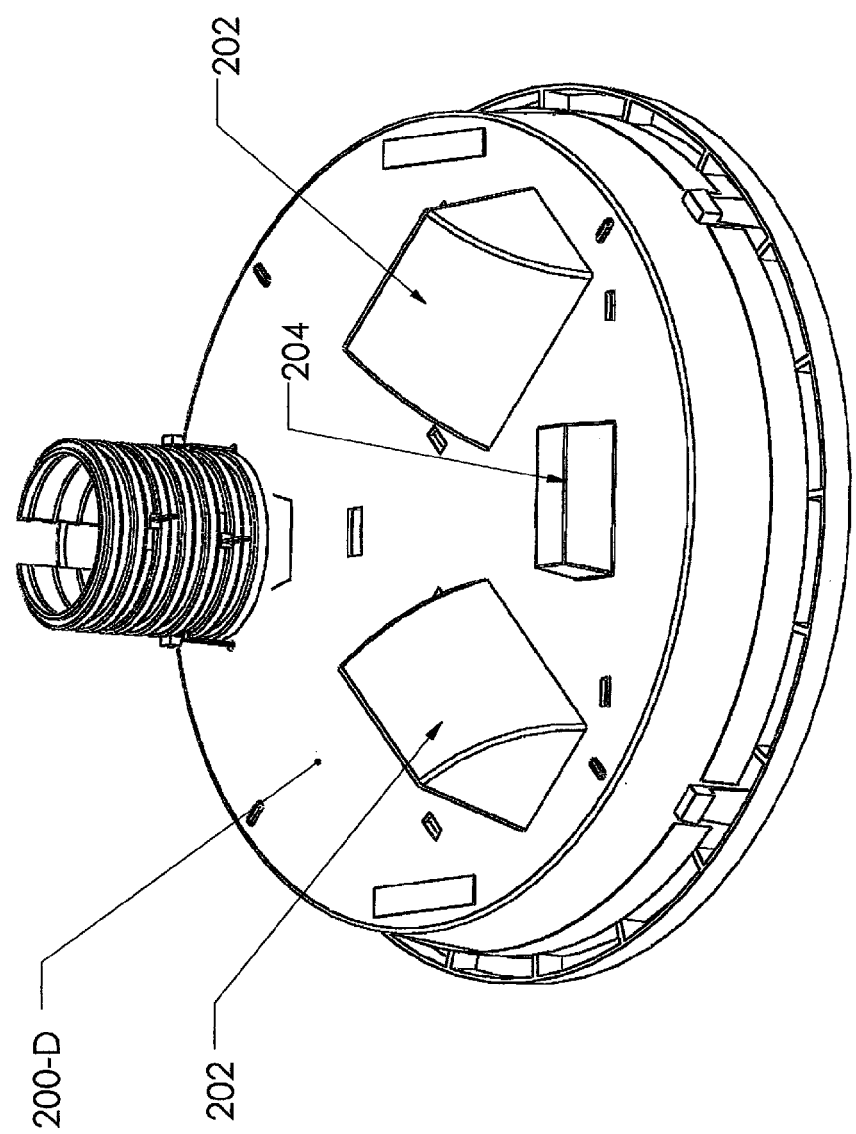
FIG. 13 is a perspective view of the top of the fourth embodiment of the lid with curved edge and domed air outlets directed in opposite directions.

Specifically, the lid 200 has on the top two rectangular air outlets 202 whose top is domed and the side walls are inclined. The two air outlets 202 are an integral part of the lid and are molded with the lid 200. The air outlets 202 are preferably parallel with respect to each other and oriented on the same side as shown in FIG. 1. However, it is also understood that they may be oriented to one side or the other of the lid relative to the axis YY' (FIGS. 11, 12 and 13). The air outlets direct air towards the floor and side with respect to the operator. All around the air outlets 202 is shown the base of the six hooks 212. These hooks on the underside of the lid serve to hold the two strainers 41 (FIG. 5). These strainers are used to filter the air going out of the lid by the air outlets 202.

On top of the lid 200, a handle 204 is created by extruding the wall of the top of the lid. The center of the handle 204 is on the axis YY' (FIG. 2) near the top edge of the lid 200. The handle 204 is especially useful to allow one to direct the lid during the collection of debris and to lift the opening of the collection bag 70 (FIGS. 9 and 10) from time to time to move debris to the bottom.

The lid 200 also has an opening 206 on the top near the edge to insert the elbow 216 (FIGS. 3, 5, 6, 7) for the entrance of debris through the lid 200. The opening 206 is partially round shaped with a U-shaped extension whose base is flared towards the center of the lid 200. On each side of the opening 206, there are two small holes 18. These holes serve as anchor points for cable ties to hold the ribbed coupling pipe.

Figure 9:
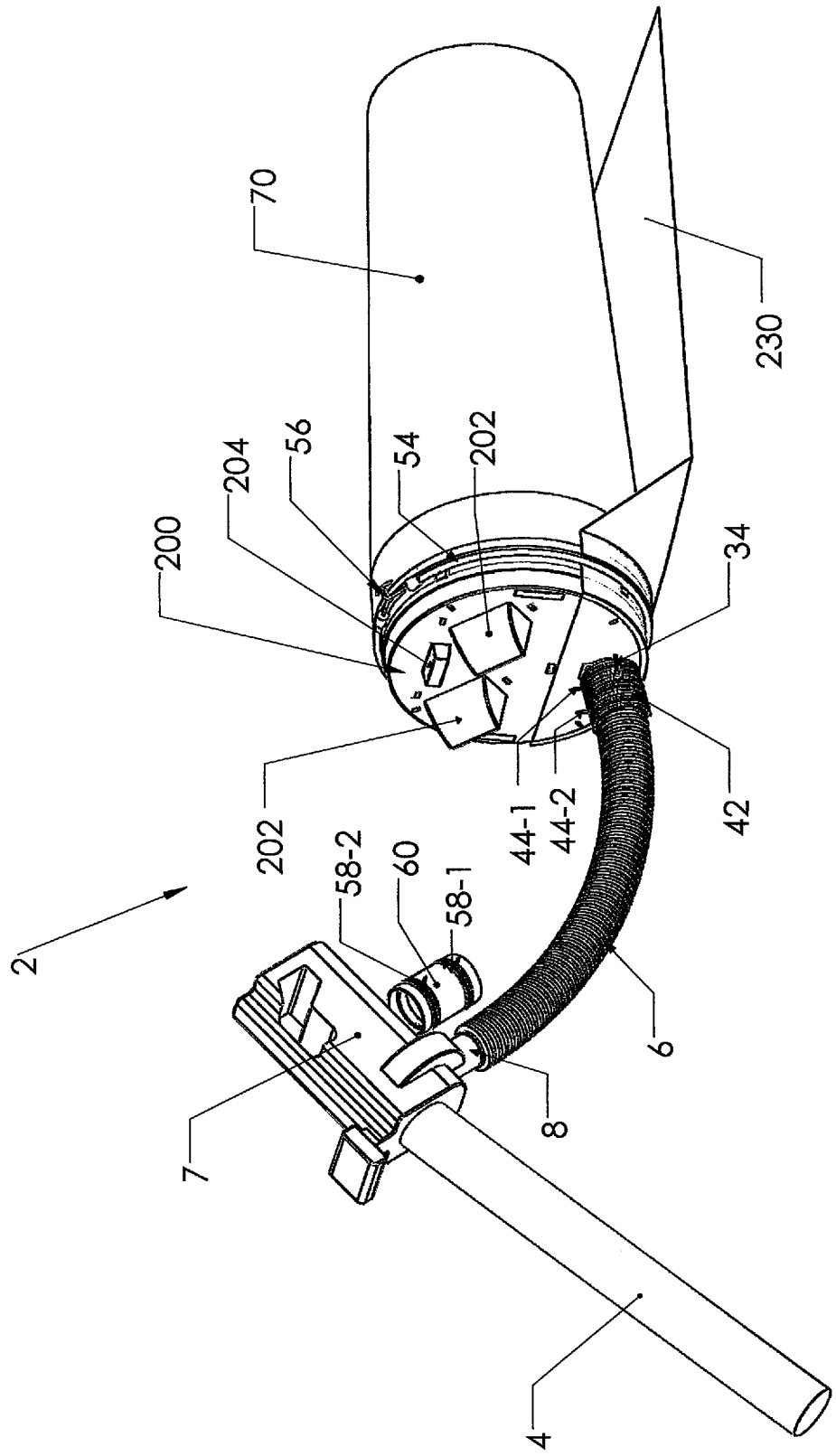
FIG. 9 is a perspective view of the first embodiment of the lid with curved edge and domed air outlets inserted into the debris collection system in its assembled form, which is connected to the output of a blower/vacuum.
Figure 10:
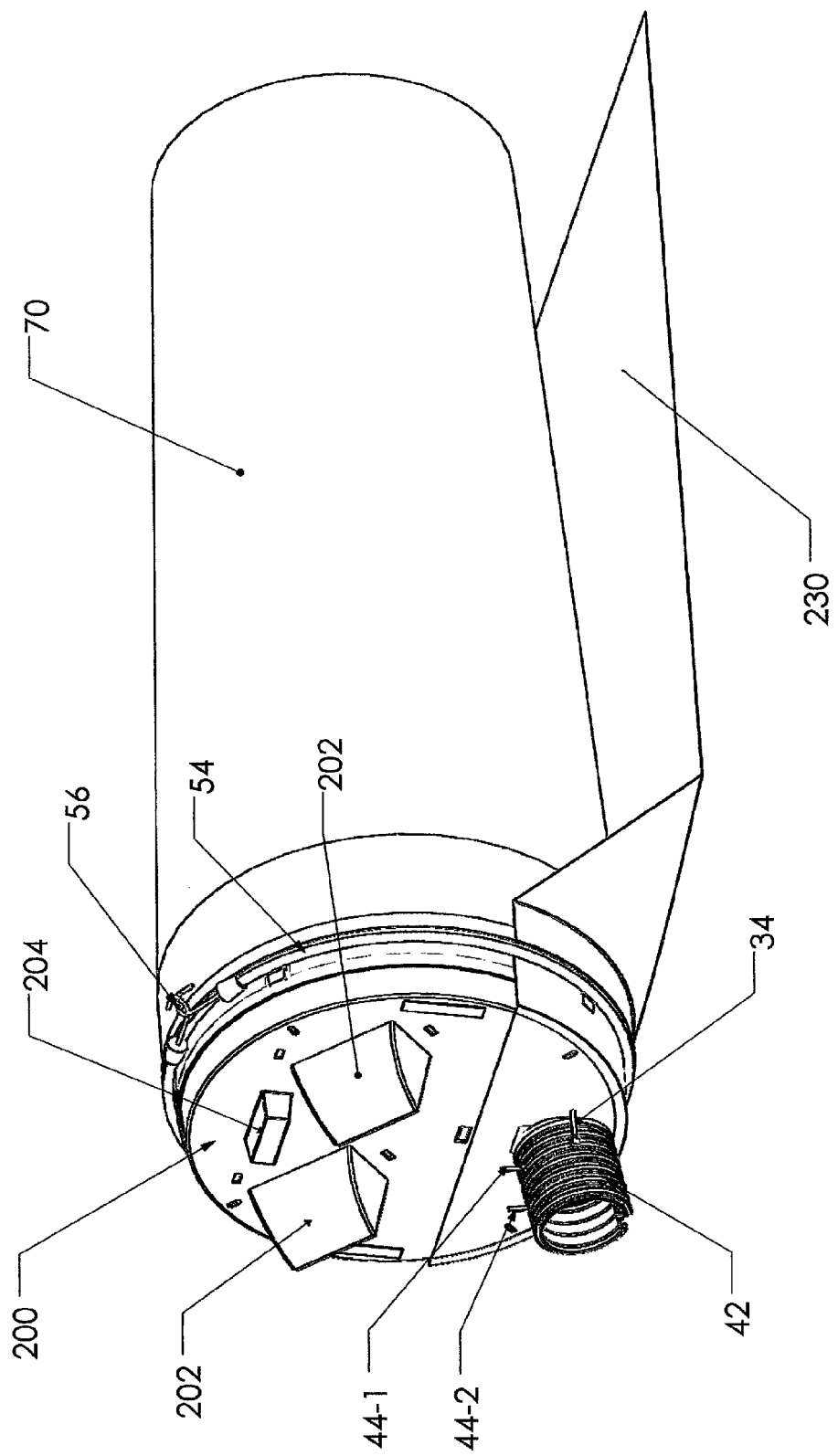
FIG. 10 is a perspective view of the first embodiment of the lid with curved edge and domed air outlets with the debris collection bag, the membrane and the elastic cord.

The shape of the flared U-shape portion of the opening 206 creates a space to take up and guide the outlet of the elbow 216 (FIGS. 3, 5, 6 and 7) to the underside of the lid with an angle of about 10 degrees. This angle ensures that debris crushed by the blower/vacuum 7 (FIG. 9) hits the rigid wall of the lid before being directed to the debris collection bag 70 (FIGS. 9 and 10). Near the base of the U of the opening 206, is also visible the base of the hook 214 used to hold the elbow 216 (FIGS. 3, 5, 6 and 7) for the entrance of debris on the inner side of the lid 200.

On top of the lid, four small protrusions 9 indicate the position of four elevations 208 (described below) on the outer wall of the lid. The protrusions 9 are only used as reference points. Still on top of the lid, two rectangular marks 15 with the name WILDENLAL are printed near the edge of the lid in the central axis XX' (FIG. 2).

The wall 21 of the lid 200 is inclined a few degrees outwards in order to facilitate the movement of debris to the debris collection bag 70 (FIGS. 9 and 10). The lid 200 has a curved edge 27 bent in a U-shape consisting of the side wall of the lid and the curvature of the extension of the latter bent towards the outside of the lid. Inside the U are lateral reinforcements 31, placed at regular intervals to give more rigidity to the lid 200. Also, at regular intervals, four elevations 208 are placed on the outer wall, preferably rectangular in shape, but can also be square or round. The elevations 208 are molded with the lid so as to leave a minimum space of 1 cm between the elevation and the curved edge. The elevations are of sufficient height to keep in place an elastic cord 54 (FIGS. 9 and 10) to be placed in the space between the curved edge and the elevations. Four sections of anti-skid adhesive tape 210, approximately 2.5 cm wide, are located immediately after the curved edge and are placed on the outside of the side wall of the lid 200. The sections of anti-skid tape 210 are discontinuous and are placed between the elevations 208. Sections of anti-skid tape 210 allow for an increase in the friction between the wall 21 of lid 200 and the debris collection bag 70 (FIGS. 9 and 10) to hold it in place around the lid.

Figure 2:
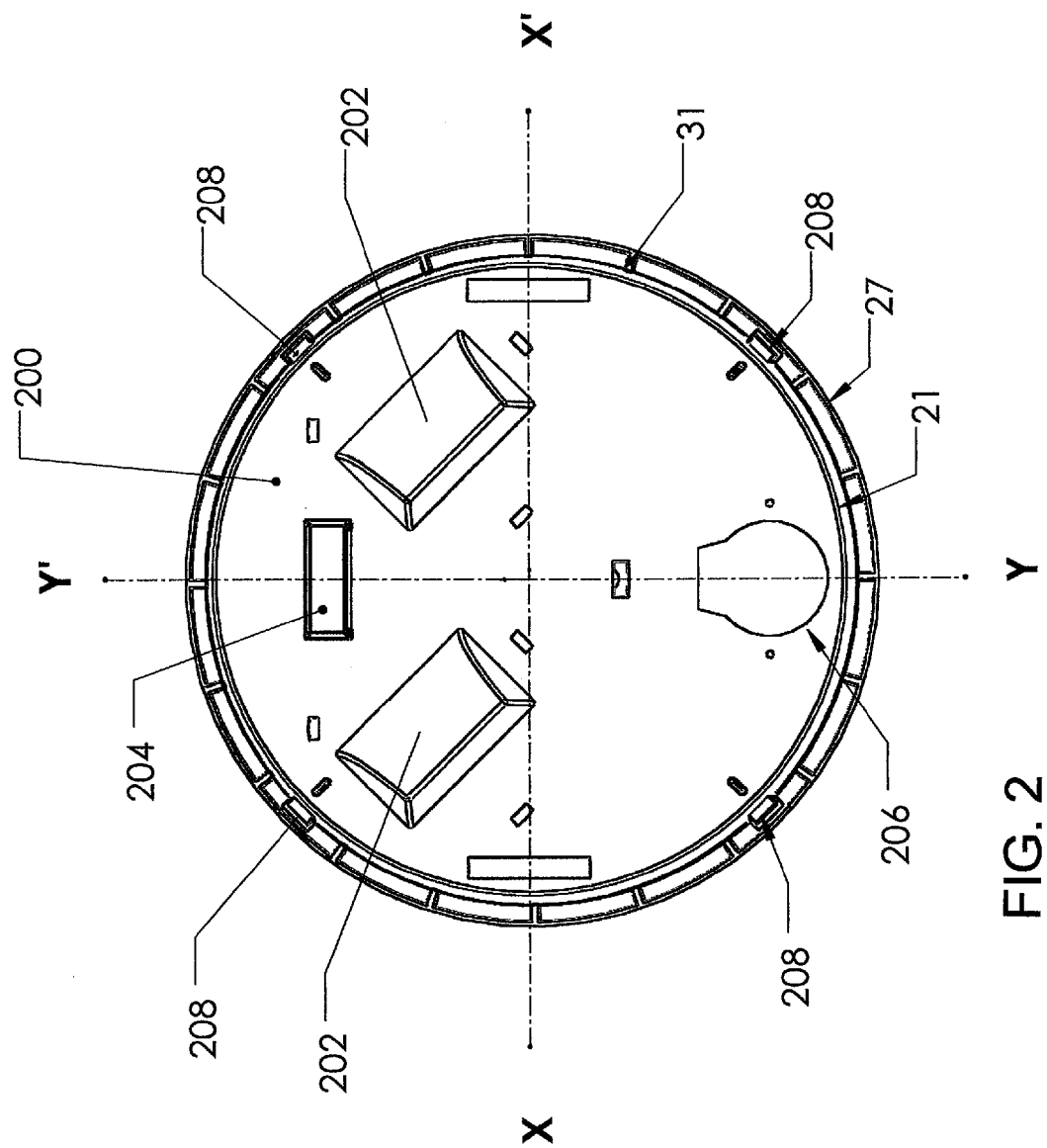
FIG. 2 is a top view of the first embodiment of the lid with curved edge and domed air outlets.

FIG. 2 is a top view of the first embodiment of the lid 200 showing the openings of the two air outlets 202 in the XY' and X'Y' quadrants, the angle of the front side is 45 degrees with respect to the axis XX'. It is also understood that the angle of the front side of air outlets 202 can vary from an angle of 45 to 90 degrees with respect to the axis XX' (FIGS. 11, 12 and 13). The center of air outlets 202 is preferably located at equal distances from the axis XX'. The center of the air outlets 202 is also preferably located at equal distance from the axis YY'. The distance between the centers of the air outlets 202 is not however the same from axes XX' and YY'.

The opening 206 has a round shape with a U-shaped flared extension part. The round part allows for insertion of the male part of the elbow 216 (FIGS. 3, 5 and 6), but not that of the female part, which is larger. The elbow 216 is maintained by the shouldering of the female part. This U-shaped flared extension is essential in order to guide the output of the elbow 216 to the underside of the lid 200 and for the direction of debris that enters through the elbow 216. Without the presence of this flared U-shape, debris is projected in a straight line to the outlet of the elbow 216, which requires the addition of a protective wall on the opposite side to protect the debris collection bag 70 (FIGS. 9 and 10). On the periphery of the lid 200, one can see the 360 degree curved edge 27 with a U-shape and reinforcements 31 in the groove. The number of reinforcements shown here are 20, but it may be more or less according to desired stiffness of the lid 200. On the side wall 21 of the lid 200, we notice the presence of four elevations 208, rectangular in shape here, but could be square, round or other. The role of these elevations is to keep the elastic cord 54 (FIGS. 9 and 10) around the lid 200. The four elevations are disposed preferably at an angle of 45 degrees with respect to the central axis YY'. It is understood that this layout is not limiting and that the angle may be different from the central axis YY', and that a number smaller or larger than four elevations can be used. The handle 204 can guide the lid during the collection of debris. This handle is molded with the lid 200 during its manufacture. The handle 204, having its center on the axis YY', is rectangular. The handle 204 at its base creates an opening in the top of the lid 200. This opening is closed inside the lid by the insertion of a piece (plastic or other material) to avoid the exit of debris.

Figure 3:
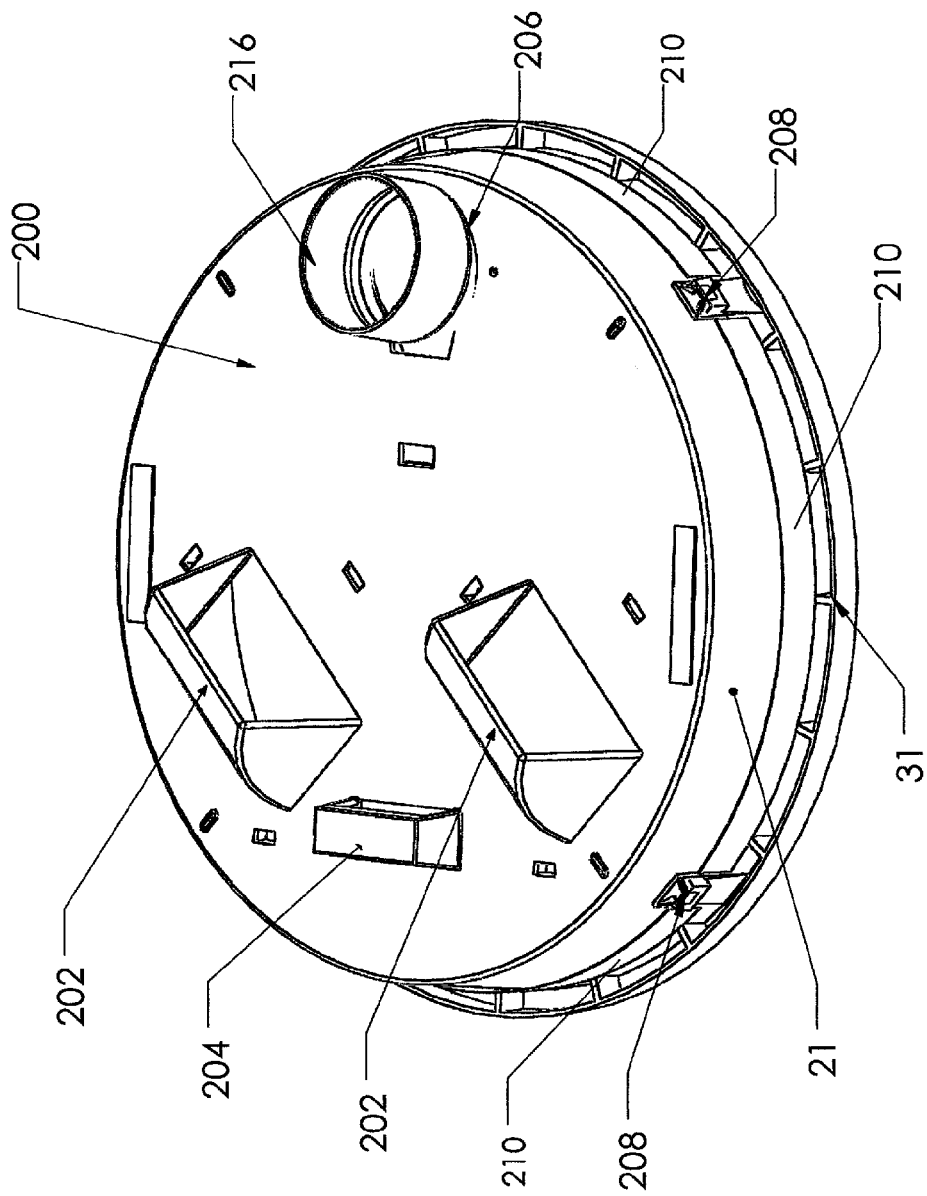
FIG. 3 is a perspective view of the side of the first embodiment of the lid with curved edge and domed air outlets with the 90 degree elbow to the debris entrance.

FIG. 3 is a perspective view of the side of the first preferred embodiment of the lid 200 with the air outlets 202 facing the same side and at an angle of 45 degrees to the axis XX' (FIG. 2). The side walls of the air outlets 202 are inclined inwardly while the top is rounded. The handle 204 is centered on the axis YY'(FIG. 2) and is perpendicular to the axis YY'. The handle 204 is rectangular in shape and has an opening on the front (side closest to the axis XX'). The rear portion of the handle 204 is closed and inclined. The 90 degree elbow 216 is shown inserted into the opening 206 and only the female part of the elbow 216 is visible. The elbow 216 is inserted up to the shoulder of the female part, which has a larger diameter than the opening 206. It should be noted that the male part of the elbow 216 has a diameter smaller than that of the opening 206 and allows the insertion of the elbow into the opening 206.

Two of the four elevations 208 are shown on the sidewall 21 of the lid 200. These elevations are molded with the lid and keep the elastic cord 54 in place (FIGS. 9 and 10). The preferred position of the four elevations is 45 degrees with respect to the axis XX' and YY' (FIG. 2). It is also understood that the number of elevations and their position relative to the axes XX' and YY' may be different from that shown in FIG. 3. The elevations 208 are located so as to leave a minimum space of 1 cm between the elevations and the curved edge. The elevations have a sufficient height to keep the elastic cord 54 in place (FIGS. 9 and 10), which will be placed in the space between the curved edge and the elevations.

On the wall 21, at the limit of reinforcements 31, sections of adhesive anti-skid tape 210 are placed between elevations 208. The preferred number is four sections of anti-skid tape 210, but it is understood that it can be smaller or larger depending on the number of elevations 208. At this point, sections of anti-skid tape allow for an increase in friction on the wall of the lid 200, which will help to keep the edge of the debris collection bag 70 in place (FIGS. 9 and 10).

Figure 4:
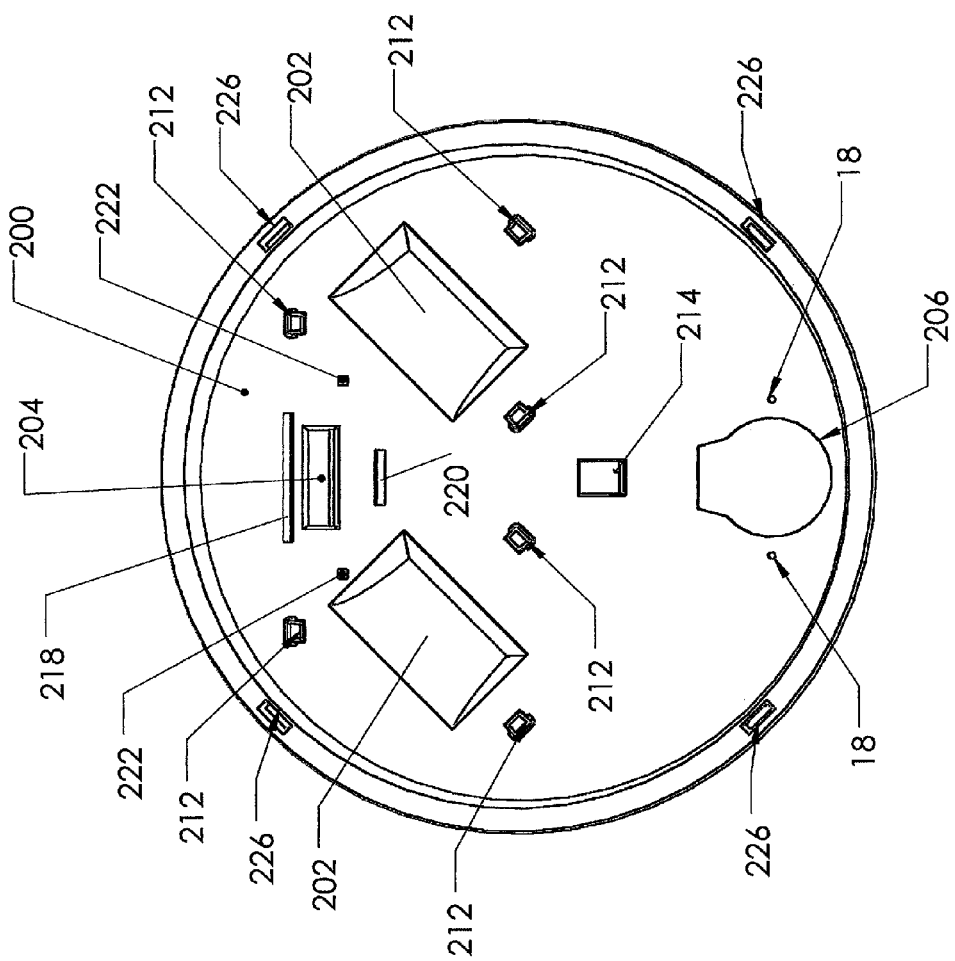
FIG. 4 is an underside view of the first embodiment of the lid with curved edge and domed air outlets.

FIG. 4 is an underside view of the first embodiment of the lid 200. This view shows the inside of the two rectangular openings of the air outlets 202 of which the angle is 45 degrees with respect to the axis XX'. It is also understood that the dimensions of the air outlets 202 may be smaller or larger than those shown in FIG. 4.

The inside of the handle 204 and its rectangular shape are also shown in FIG. 4. On each side of the opening of the handle 204 are the elevations 218, 220 and 222, which are molded with the lid. These elevations of a few millimeters in height are used to hold up a rectangular piece 222 (FIG. 5) which will be placed between these elevations. This will serve to close the opening created in the lid 200 during the molding of the handle 204.

Three hook-shaped elevations 212 are placed around each of the two air outlets 202 to hold the two strainers 41 (FIG. 5). The hooks 212 are arranged in an isosceles triangle in the preferred arrangement, but it is also understood that they may be arranged in different ways. It is also understood that the number of the hooks 212 may be smaller or larger than three to hold the strainers 41 (FIG. 5).

Figure 8:
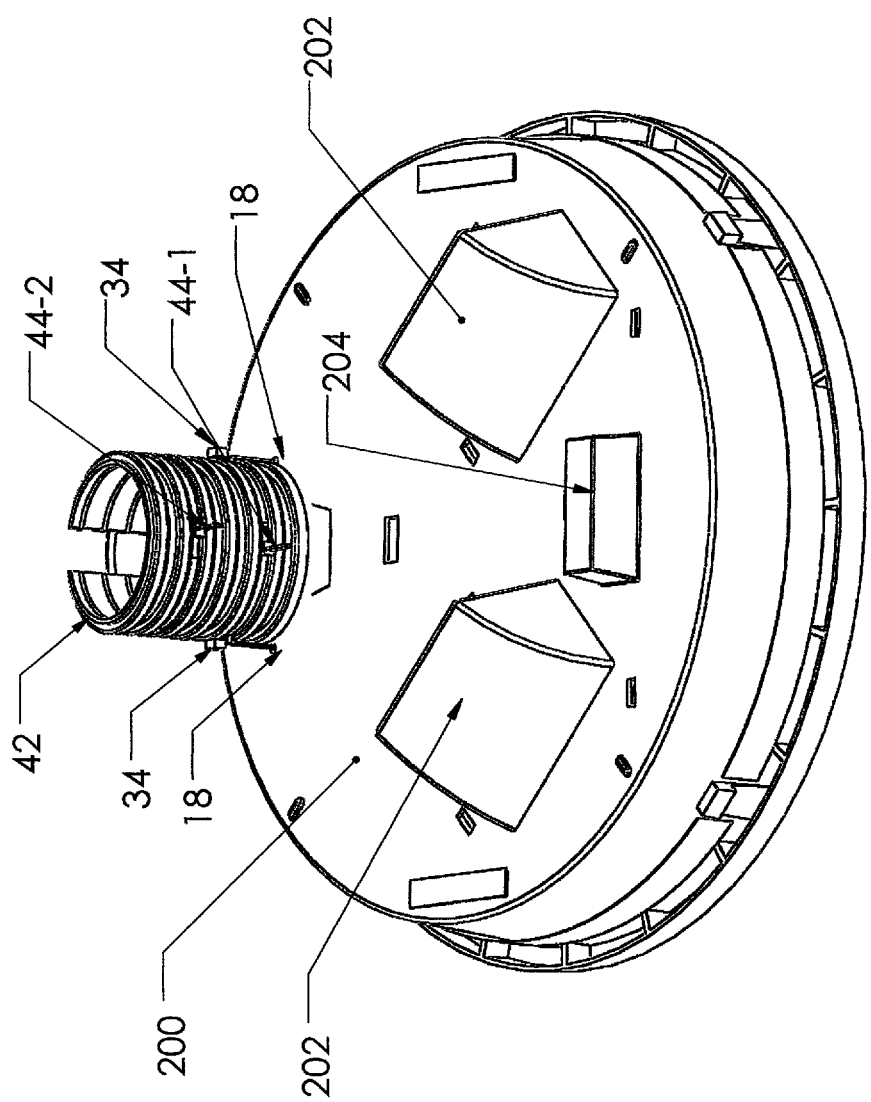
FIG. 8 is a perspective view of the first embodiment of the lid with curved edge and domed air outlets with ribbed coupling pipe.

In FIG. 4, elevation 214 is also represented, which is hook-shaped and is used to hold up the end of the male part of the 90 degree elbow 216 for the entrance of debris (FIG. 5). This elbow is inserted by its male part into the opening 206. On each side of the opening 206, there is a hole 18 for inserting a flexible cable tie, two cable ties will be used to hold the ribbed coupling pipe 42 (FIG. 8). Finally, in the edge of the lid 200, there are four holes 226. These holes are necessary to enable the molding of the elevations 208.

FIG. 5 is an underside view of the first embodiment of the lid 200. This view shows the elbow 216 whose output is oriented both towards the underside of the lid 200 and between the two strainers 41. The 90 degree elbow 216 is held at the end of the male part (in contact with the underside of the lid 200) with the hook 214 mold with the lid. The elbow 216 has a small rear elevation 224 in a hook shape immediately after the shoulder of the female part of the elbow. This elevation prevents the removal of the elbow after its insertion into the opening 206 (FIG. 4).

The two strainers 41 cover the two openings for the air outlet 202 (FIG. 4) and are placed concentrically to the openings 202. The strainers 41 are used to filter the air going out and the retention of debris in the debris collection bag 70 (FIGS. 9 and 10). Note that the strainers 41 do not have ears on the rigid edge. In this arrangement, the strainers 41 are attached to lid 200 with three hooks 212, the arrangement allows the hooks to hold the strainers 41 by their rigid edge.

FIG. 5 also shows the rectangular piece 222 that covers the opening of the handle 204 (FIG. 4) and the elevations 218 and 220 which serve to hold up the piece 222. The piece 222 is held in place by the rigid edge of the strainers 41 that rest on it and prevents it from rising. The piece 222 is flat in shape and prevents a part of the debris that enters from going out through the opening of the handle 204. The piece 222 is shown in FIG. 5 without holes, but it is also understood that it may have small holes to allow filtration and air outlet. FIG. 5 also shows the holes 226 created during the molding of elevations 208 in the lid 200.

Figure 6:
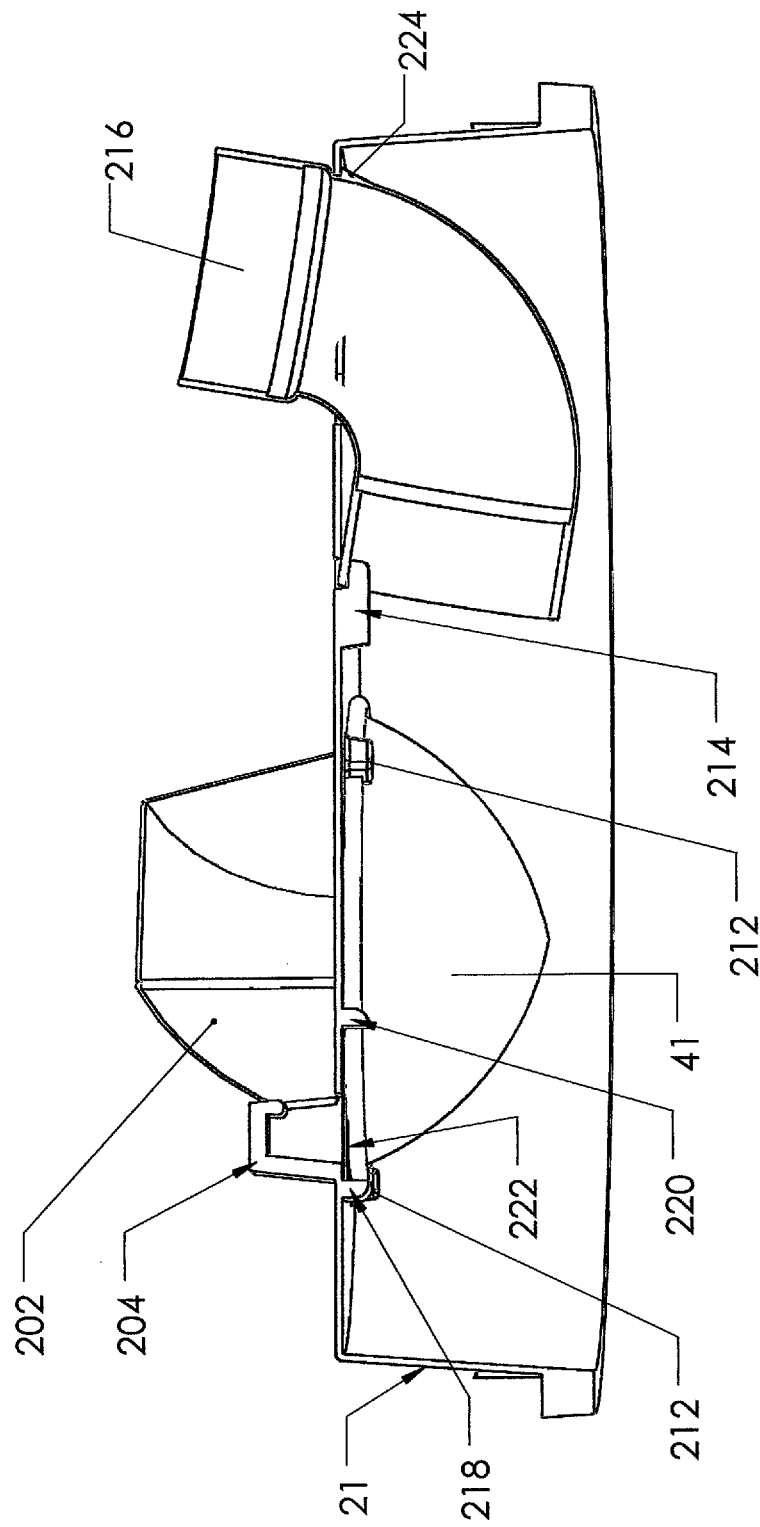
FIG. 6 is a cross section along the axis YY' of the first embodiment of the lid with curved edge and domed air outlets.

FIG. 6 is a cross section along the axis YY' of the lid 200 of the first embodiment. One can see one of the air outlets 202 oriented at 45 degrees with respect to the axis XX' and the domed shape of the rear and top and the side walls inwardly inclined. FIG. 6 also shows the insertion of the 90 degree elbow 216 with hook 214 inserted into the male part of the elbow 216. The hook 214 allows the elbow to keep contact with the inside of the lid and prevents its forward movement. The hook 214 also helps to provide an angle of about 10 degrees to the outlet of the elbow 216 to the underside of the lid 200 and to direct the debris to the underside of the lid 200 and the inside of the wall 21 which is opposite the elbow 216. The wall 21 has the role of absorbing the shock of debris and diverting them into the bag 70 (FIGS. 9 and 10) in order to protect it. Debris and air are directed between the two strainers 41 to protect them from the shock of falling debris and to let air out only through the two strainers 41 and the air outlets 202 (FIG. 4). The hook 224 at the rear of the elbow 216, just after the shoulder of the female part, is also shown. This prevents removal of the hook elbow 216 once it is inserted into the opening 206 (FIG. 4).

The handle 204 is shown on the side and shows its hook shape, one of the lateral sides not being shown. The hook shape gives an elevation that allows the operator to hold the lid. You can also see the back wall inclined forward towards the opening. The elevations 218 and 220 that can hold the piece 222 are also shown. In FIG. 6, one of the hooks 212 is clearly visible and shows its position on the rigid edge of the strainer 41 to keep it in contact with the inner wall of the lid 200.

Figure 7:
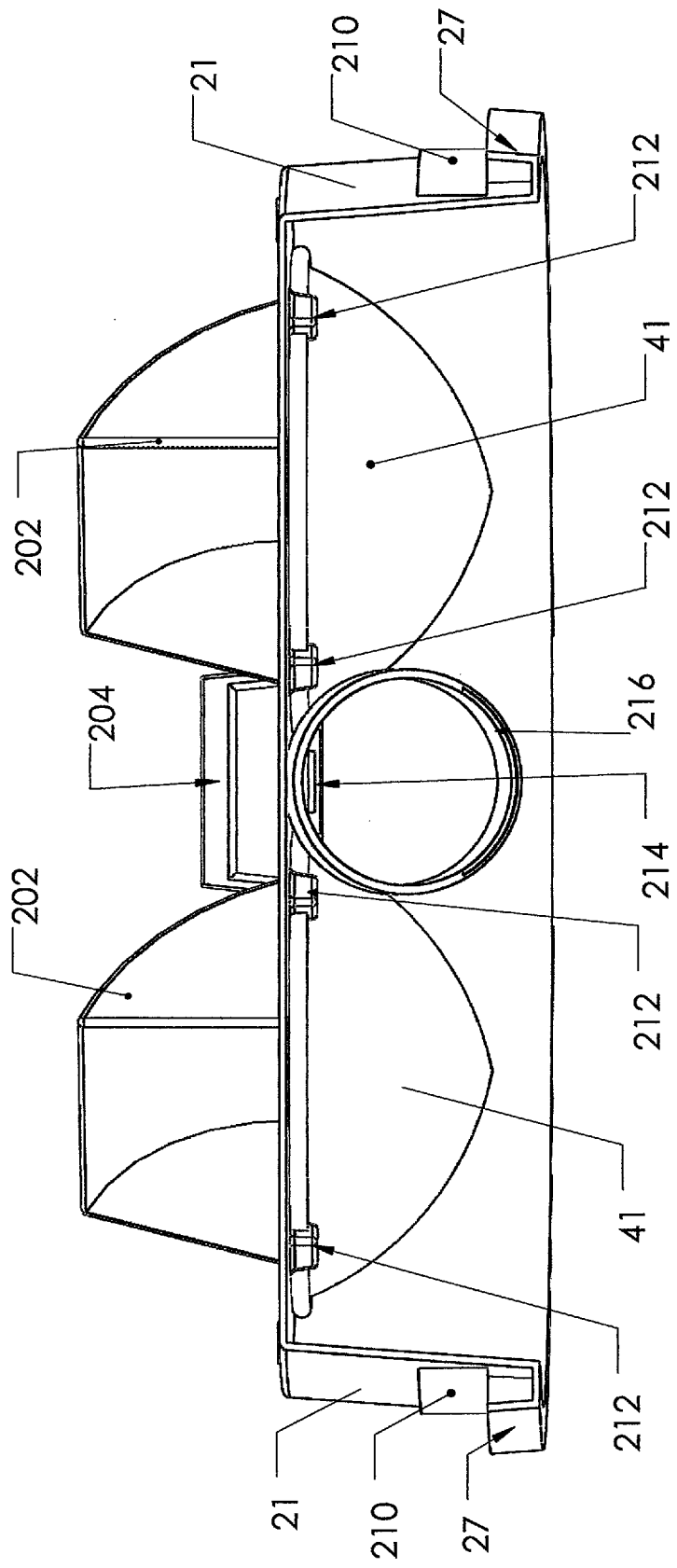
FIG. 7 is a cross section along the axis XX' of the first embodiment of the lid with curved edge and domed air outlets.

FIG. 7 is a cross section along the axis XX' (FIG. 2) of the first embodiment of the lid 200. In this representation, we see the two strainers 41 on either side of the male part of the elbow 216 through which the debris enters into the lid 200. The hook-shaped elevation 214 used to hold up the elbow 216 and handle 204 are shown from another angle as in FIG. 6. On top of lid 200, the two air outlets 202 for the output of the air which is injected at the same time as the debris are also shown. FIG. 7 also shows four hooks 212 that hold the rigid edge of strainers 41 in contact with the inside of the lid. We also see some sections of anti-skid tape 210 glued to the wall 21 at the edge of the curved edge 27.

FIG. 8 is a perspective view of the first embodiment of the lid 200 with the air outlets 202 oriented at 45 degrees with respect to the axis XX' so that air exiting is directed to the side and towards the ground, away from the face of the operator. Notably, one can see the domed shape of the top and the rear of the air outlets 202 and the handle 204 to facilitate manipulation of the lid 200. The ribbed coupling pipe 42 and the various flexible cable ties 34, 44-1 and 44-2 to attach the ribbed coupling pipe 42 to the lid 200 and the ribbed connecting pipe 6 (FIG. 9) are also visible. The fasteners 34 are built with two flexible cable ties inserted into each other. The tail part of a cable tie is inserted into one of the holes 18 through the top of the lid and, (underneath of the lid), the tail is inserted into the head (the interlocking part) of a similar second cable tie. The head of the cable tie on the inside serves as an anchor at the hole 18, while the head of the cable tie on the top of the lid will be tightened up by the cable tie 44-1 to hold the ribbed coupling pipe 42. The two fasteners 34, which pass right through the lid 200, are vertical to the top of the lid 200. The cable tie 44-2 is placed in a groove of the ribbed coupling pipe 42. The ribbed connecting pipe 6 (FIG. 9) is inserted inside the ribbed coupling pipe 42 by superimposing the grooves and the crests of the two ribbed pipes. The compression of the cable tie 44-2 keeps the ribbed coupling pipe 42 and the ribbed connecting pipe 6 together.

The ribbed coupling pipe 42 is split along its length to allow the insertion of the female part of the elbow 216 (FIGS. 3 and 6) into it. It should be noted that in the preferred form, the ribbed coupling pipe 42 is facing away from lid 200 so that the slot is close to the ground during use (FIGS. 9 and 10). It is also understood that the ribbed coupling pipe 42 could be oriented in other directions over 360 degrees. When the ribbed coupling pipe 42 surrounds the elbow 216, the cable tie 44-1 is placed just below the head of the two fasteners 34 and is clamped firmly against the ribbed coupling pipe 42. The tightness distorts the fastener 34 so that it matches the shape of the groove of ribbed coupling pipe 42. Once the cable tie 44-1 tightened, the head of the fastener 34 holds the ribbed coupling pipe 42 to the lid 200. The cable tie 44-2 shown in FIG. 8 surrounds part of the ribbed coupling pipe 42 which will be placed over one end of the ribbed connecting pipe 6 (FIG. 9). The other end of the ribbed connecting pipe 6 is connected to the fan outlet 8 of the blower/vacuum 7 (FIG. 9). The ribbed coupling pipe 42 and the ribbed connecting pipe 6 have the same shape and the same size so that the grooves of the two pipes fit perfectly into each other when the ribbed connecting pipe 6 is inserted into the ribbed coupling pipe 42. The excess of tail part of cable ties 44-1 and 44-2 are directed towards the center of the lid in order not to hinder the movement of the lid 200 on the ground and also to facilitate the installation of the bag 70 (FIGS. 9 and 10) around the lid 200. It should be noted that the installation and the attachment of the ribbed coupling pipe 42 are the same for all embodiments described herein.

FIGS. 9 and 10 are perspective views of the lid 200, according to the first embodiment, inserted into the debris collection system 2 in its assembled form. The debris collection system 2 includes the suction pipe 4 and the fan outlet 8 of the blower/vacuum 7, the Poly Tubing coupling sleeve 60 with cable ties 58-1 and 58-2, the ribbed connecting pipe 6, the ribbed coupling pipe 42, the cable ties 44-1 and 44-2 surrounding the ribbed coupling pipe 42, the fasteners 34 holding the ribbed coupling pipe 42 to the lid, the lid 200 with the two air outlets 202, the handle 204, the elastic cord 54 and the hook 56 to hold the bag 70 around the lid 200 and the protective membrane 230. A detailed description of the collection system is presented in the patent applications CA 2,748,583 (U.S. Ser. No. 13/539,322) and CA 2,764,509 (U.S. Ser. No. 13/555,147). The membrane 230 has a hole of approximately 5 cm from the front edge to allow its insertion around the ribbed coupling pipe 42. Once the membrane 230 is inserted, it is held in place by the ribbed coupling pipe 42 and the elastic cord 54. In this arrangement, the edge of the debris collection bag 70 is placed around the lid 200, and the elastic cord surrounds both the membrane 230 and the debris collection bag 70. The latter is caught between the edge of the lid 200 and the membrane 230. This arrangement keeps the membrane 230 under the bag 70 during the movement. The membrane 230 is formed in its preferred form with a bag in thick plastic or other resistant material. The elastic cord 54 is shown with a hook type of single stem, but it is also understood that other forms of hooks can be used. It is also noted that the cable tie 58-2 used to hold the Poly Tubing coupling sleeve 60 to the fan outlet 8 of the blower/vacuum 7 is a flexible, reusable cable tie. This is to permit release of the blower/vacuum 7 for storage. Also a flexible, reusable cable tie can be used as cable tie 44-2 to facilitate the storage.

Not shown in FIGS. 9 and 10, a thick plastic membrane (or other) of a size of about 30 cm by 20 cm can be stuck on the wall of the lid, behind the handle 204, so that a part of the membrane extends inside the debris collection bag 70. This membrane provides an extension to the lid wall 200 to further protect the wall of bag 70 at the entrance of debris. This membrane can also be installed for all other embodiments described below.

FIG. 11 is a perspective view of the top of the second embodiment of the lid with curved edge and domed air outlets here called 200-B. This arrangement is distinguished only by the orientation of the air outlets 202, which are oriented toward the left side (FIG. 11) instead of to the right side (FIG. 8) of the lid 200. In this position, the air leaving the lid 200-B will be directed towards the ground to the left side instead of the right side of the lid 200.

FIG. 12 is a perspective view of the top of the third embodiment of the lid with curved edge and domed air outlets here called 200-C. This arrangement is distinguished only by the orientation of the air outlets 202, which are oriented toward the center of the lid (FIG. 12) instead of to the right side (FIG. 8) of the lid 200. In this position, the air leaving the lid 200-C will be directed towards the ground at the center instead of on the right side of the lid 200.

FIG. 13 is a perspective view of the top of the fourth embodiment of the lid with curved edge and domed air outlets here called 200-D. This arrangement is distinguished only by the orientation of the air outlets 202, one air outlet is directed to the left side and the other air outlet is directed to the right side instead of both air outlets being directed toward the right side (FIG. 8) to lid 200. In this position, the air leaving the lid 200-D will be directed towards the ground to the right side and toward the left side instead of just to the right side to the lid 200.

Figure 14:
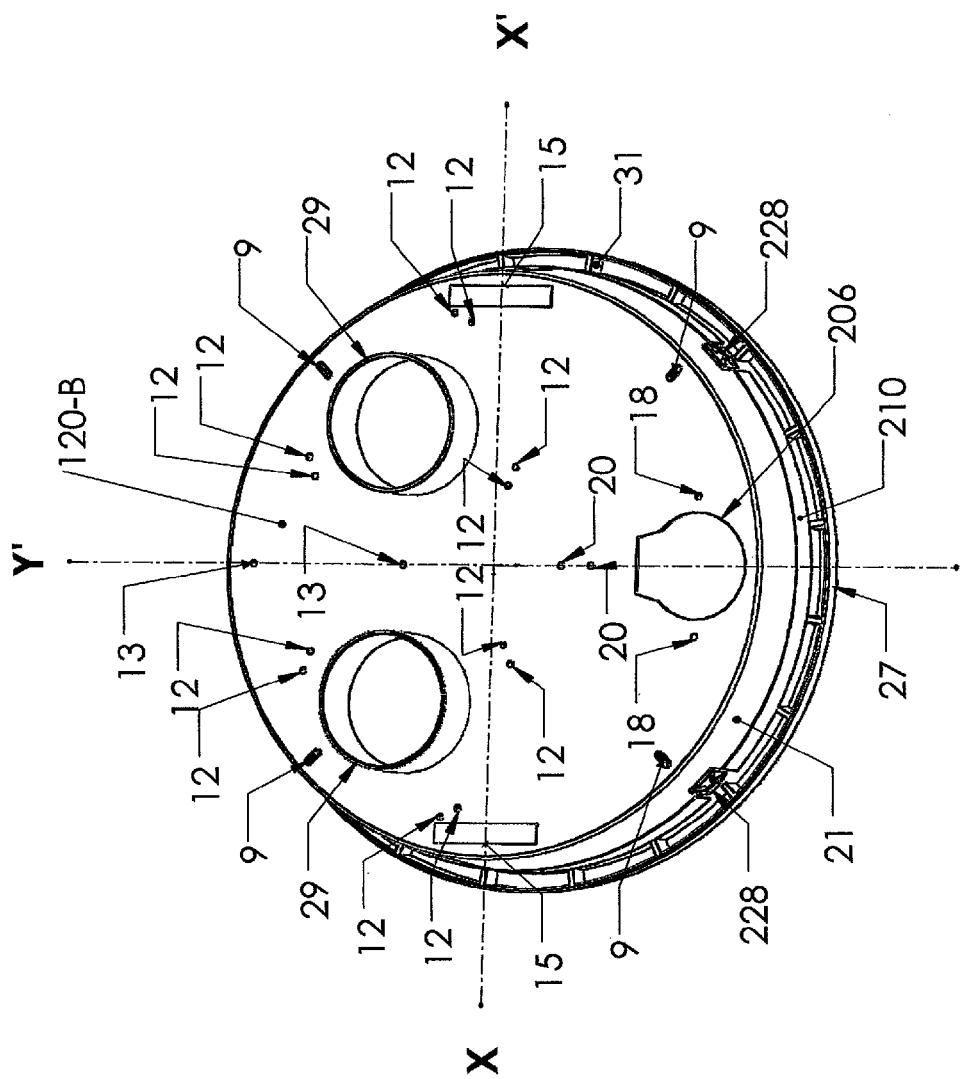
FIG. 14 is a perspective view of the top of the fifth embodiment of the lid with curved edge.

FIG. 14 is a perspective view from the top of a fifth embodiment of the lid with curved edge. In this embodiment, the lid with curved edge is called lid 120-B. The lid 120-B differs from the lid 120 described in patent application CA 2,764,509 (U.S. Ser. No. 13/555,147) from Laliberté, W. and D. Laliberté, 2012, by adding a rigid handle 77 (FIG. 15) instead of a handle formed with a flexible cable tie and by the use of plastic elevations (square) bonded to the side wall, and between four sections of adhesive anti-skid tape. Sections of anti-skid tape 210 are about 2.5 cm wide by 30 cm long. It is also understood that the number of sections of anti-skid tape and their dimensions in width or length may be different from the preferred arrangement described and shown here. The sections of anti-skid tape 210 are located immediately after the curved edge 27 at the base of the reinforcements 31. Sections of anti-skid tape 210 are discontinuous and placed between the elevations 228. The elevations 228 are placed at an angle of 45 degrees with respect to the axis XX' and located on top of the lid by the protrusions 9. The protrusions 9 are molded with the lid and indicate where the elevations 228 must be pasted on the wall 21. The elevations 228 are pasted at a minimum distance of 1 cm of reinforcements 31 in the curved edge of the lid 120-B, and preferably midway along the width of the anti-skid tape sections. Sections of anti-skid tape 210 allow for an increase in the coefficient of friction between the wall 21 of lid 120-B and the debris collection bag 70 (FIGS. 9 and 10) to hold it in place around the lid.

The lid 120-B has twelve holes 12 for the insertion of fasteners for attaching the strainers and two holes 20 for the fastener that will hold the 90 degree elbow 216 (FIGS. 15, 16, 17 and 18) to the lid 120-B. In this embodiment, only six holes 12 will be used to hold the strainers, and one hole 20 for the elbow 216. The remaining free holes will be used to evacuate air from the lid. There are two holes 18 for fasteners 34 that will hold the ribbed coupling pipe 42 (FIGS. 8, 9, 10), two holes 13 to install the handle 77 (FIG. 15) and the slightly flared wall 21 of the lid 120-B. The rectangle 15 indicates the place for the letters WILDENLAL.

The reason for the lid 120-B is to bring the elevations 228 of the curved edge to center the elastic cord 54 (FIGS. 9 and 10) over the anti-skid tape 210. The handle 77 (FIG. 15) gives a better hold to guide and carry the lid 120-B. The use of the 90 degree elbow 216 instead of two 45 degree elbows is to reduce the assembly time and the manufacturing cost.

Figure 15:
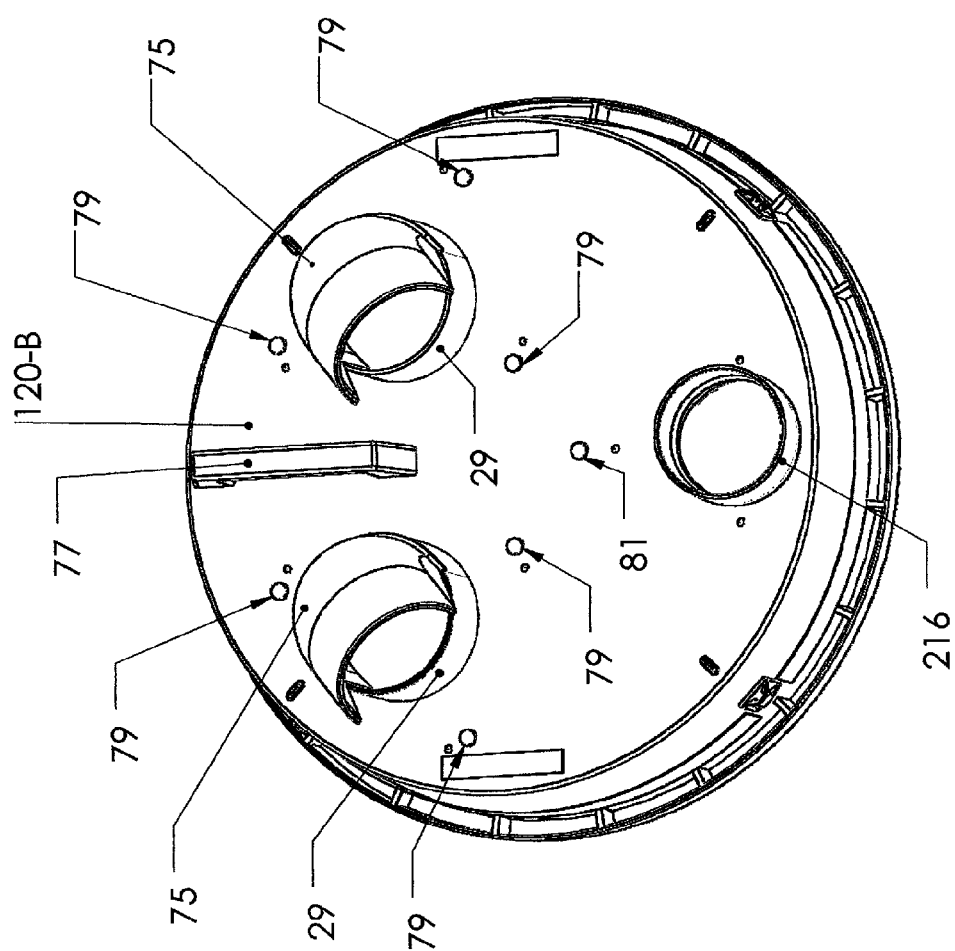
FIG. 15 is a perspective view of the top of the fifth embodiment of the lid with curved edge with the presence of elbows to deflect the air.

FIG. 15 is a perspective view of the top of the lid 120-B, for the fifth embodiment, with the presence of elbows 75 to deflect the air outlet. The elbows 75 don't have a continuous round wall, but a semicircular wall. The wall is absent in the lower part of the elbow, which allow the elbow wall to contract inwardly. The elbows 75 have a diameter greater than that of pipe 29, so it is necessary to compress the semi-circular wall of the elbow 75 to insert it inside the pipe 29. As a result, the tension created during the extension of the wall of the elbow 75 allows for a good hold of the elbow 75 by the friction created between the inner wall of the pipe 29 and the outer wall of the elbow 75. The elbows 75 are used to direct the air coming through the pipes 29 at different angles relative to the ground and away from the operator. The preferred angle of elbow 75 is 65 degrees, but it is also understood that the angle can be from 45 to 100 degrees.

On FIG. 15 is also shown the rigid handle 77, which rests on top of the lid at the level of the two holes 13 (FIG. 14). The handle 77 has two vertical holes with screw threads in both legs of the handle. The handle is attached to the lid by introducing (through the inside of the lid) two screws in the legs of the handle 77. A metal washer is under the screw head to distribute the force on the lid wall.

In addition to the elements mentioned, six bolts with a rigid flat head 79 are introduced in six holes 12 to hold the strainers 41 (FIG. 17) onto the inside of the lid 120-B. A head of the bolt rests on top of the lid and the other head on the rigid edge of the strainers. The bolts 79 are placed concentrically to the center of the openings for the air outlet so as to form a triangle. The bolts are made of two distinct parts which are inserted one into the other by pressure or by screwing when there are threads.

A last bolt, called bolt 81 is inserted into a hole 20 near the tip of the male end 216 of the 90 degree elbow. The bolt 81 prevents the forward movement of the elbow 216 and keeps it in contact with the inside of the lid at an angle of about 10 degrees.

Figure 16:
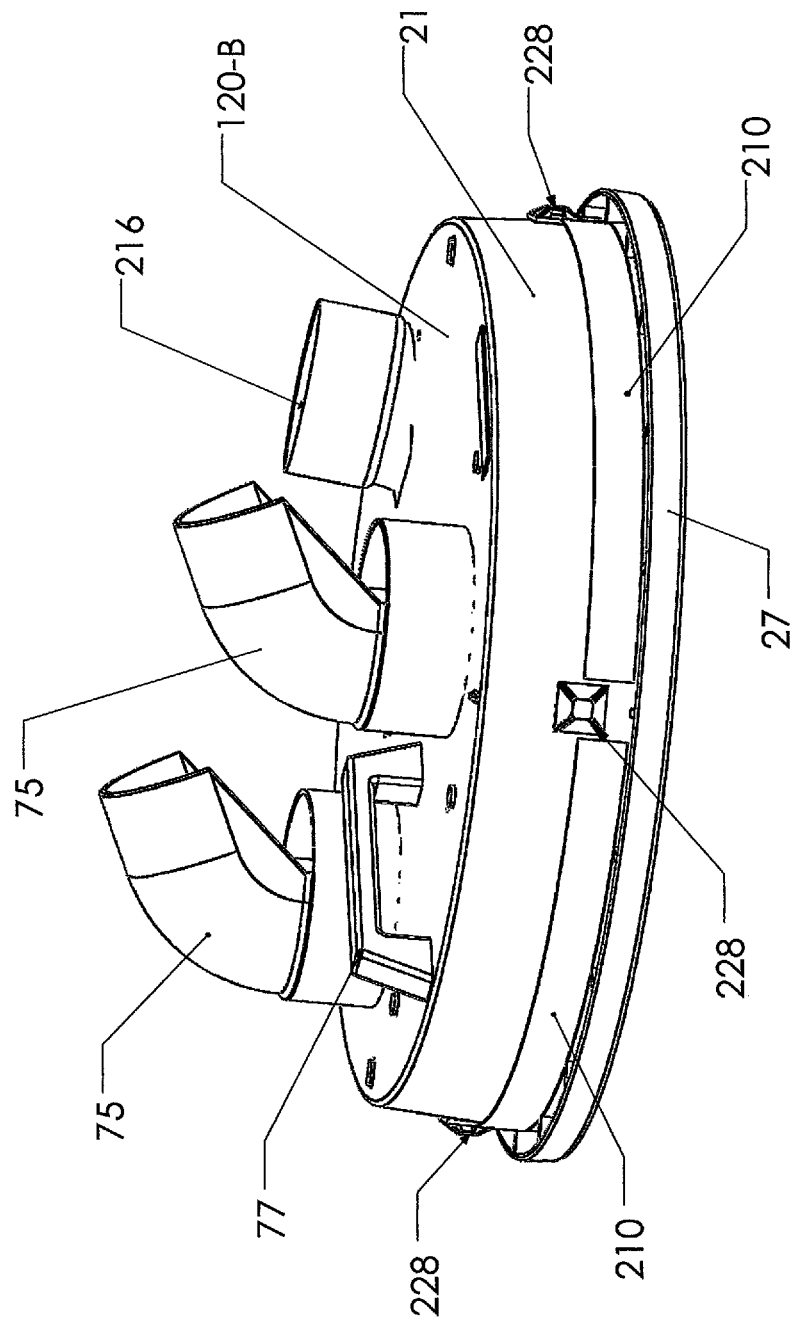
FIG. 16 is a perspective view of the side of the fifth embodiment of the lid with curved edge with the presence of elbows to deflect the air.

FIG. 16 is perspective view of the side of the lid 120-B, for the fifth embodiment, with the presence of both elbows 75 to deflect the air outlet. One can see that the elbows 75 have a side wall which extends along the side. This extension helps focus air flow in one direction. The elbows 75 can be turned laterally so as to direct the flow of air in different directions, depending on the choice of the operator. On FIGS. 15 and 16, the elbows 75 are oriented at 45 degrees with respect to the axis XX' (FIG. 14). FIG. 16 also shows the shape of the handle 77 with its legs splayed as well as the elevation 228 stuck on the wall 21 between two sections of anti-skid tape 210. The elevations 228 are glued near the curved edge 27 of the lid 120-B at mid-width of the sections of anti-skid tape 210. On top of the lid, the female part of the elbow 216 is visible and shows the inclination of about 10 degrees.

Figure 17:
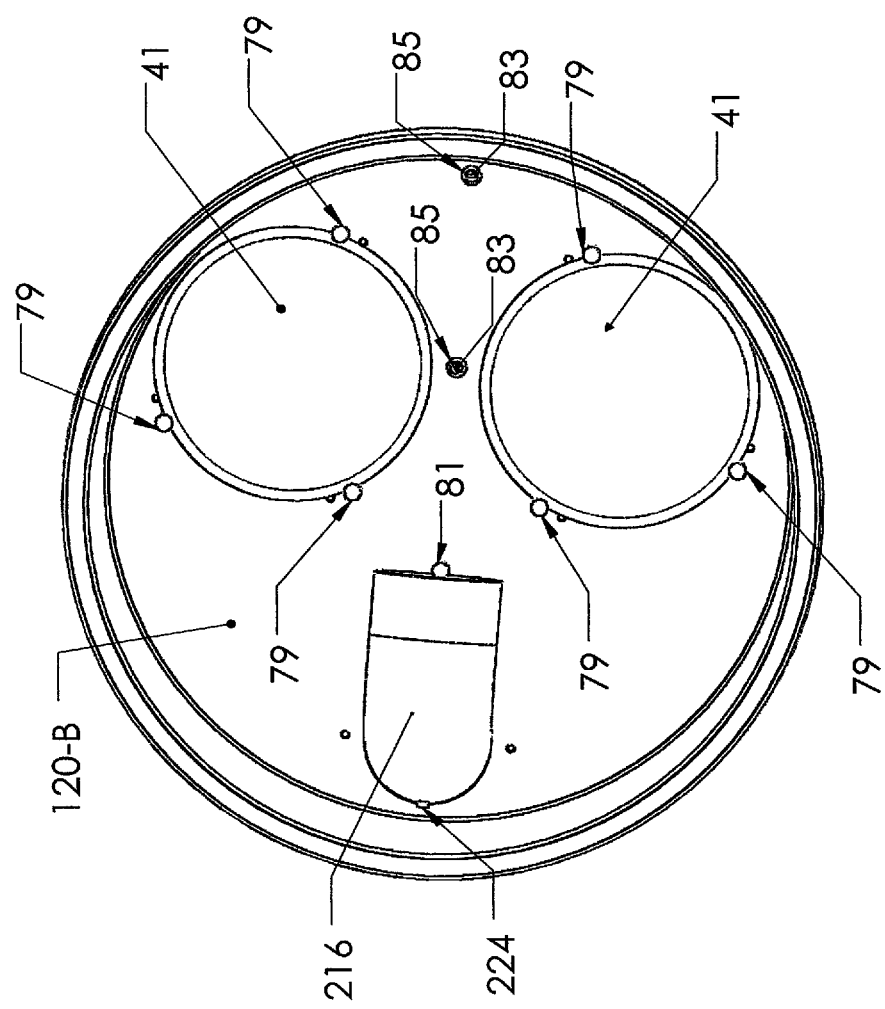
FIG. 17 is an underside view of the fifth embodiment of the lid with curved edge.

FIG. 17 is an underside view of the lid 120-B, for the fifth embodiment, with the six bolts 79 with a rigid flat head resting on top of the rigid edge of the strainers 41. These bolts keep the strainers in contact with the inside of the lid 120-B. The bolt 81 is also shown in its position to hold the tip of the elbow 216 in contact with the inside of the lid 120-B. The small hook 224 of the rear of the elbow 216 prevents removal of the elbow when it is inserted. FIG. 17 also shows the heads of two screws 83 and washers 85 used to hold the handle 77 on top of the lid 120-B. The screws are inserted into the legs of the handle 77 (FIG. 16) through the inner face of the lid 120-B.

Figure 18:
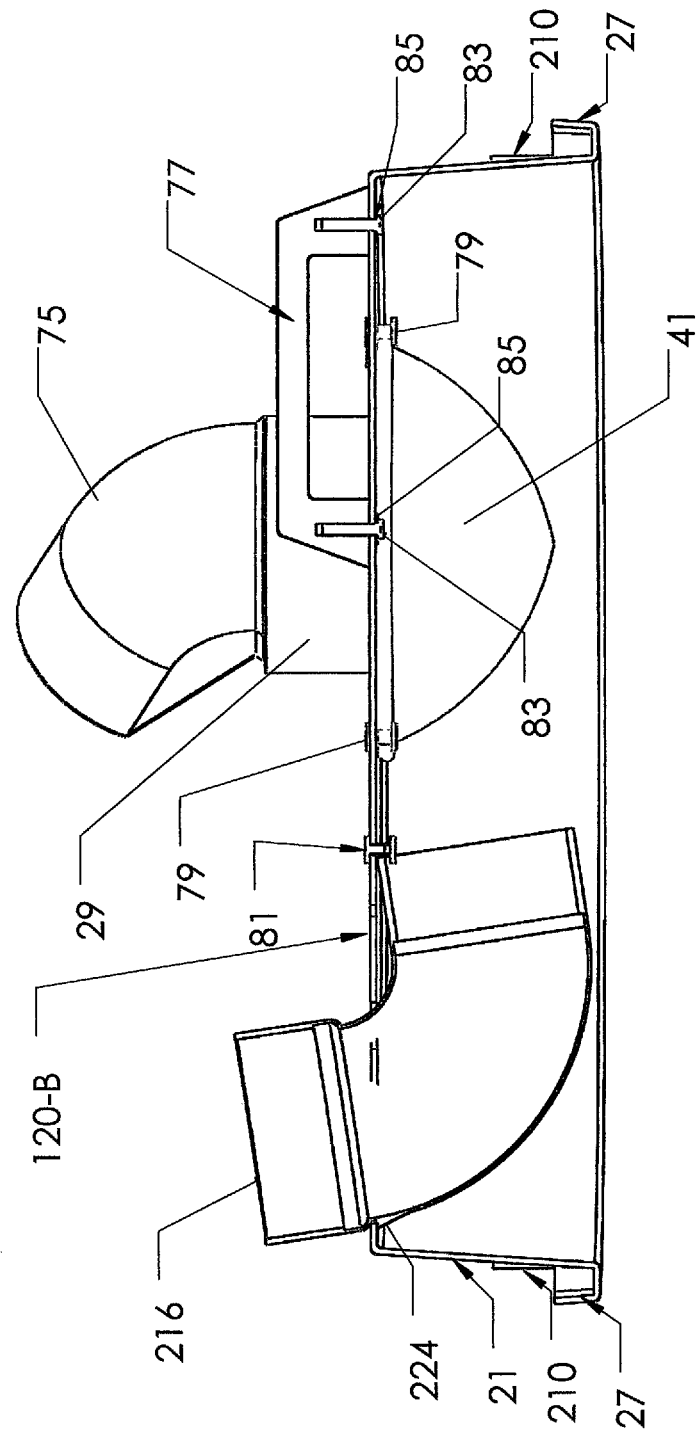
FIG. 18 is a cross sectional view along the axis YY' of the fifth embodiment of the lid with curved edge.

FIG. 18 is a cross sectional view along the axis YY' (FIG. 14) of the lid 120-B, of the fifth embodiment. This figure shows a portion of the back of the elbow 75 inserted into the opening of the pipe 29, the handle 77 with the side view of two screws 83 inserted into the legs of the handle 77 and the washers 85 between the head of the screw and the wall of the lid 120-B. FIG. 18 also shows two bolts 79 that hold the rigid edge of one of the strainers 41 in contact with the inside of the lid 120-B. Note also the elbow 216 with an angle of about 10 degrees with respect to the inner face of the lid 120-B and the flat head bolt 81 to hold the male end of the elbow 216 in contact with the inside of the lid 120-B. The position of the small hook 224 on the back of the elbow 216 is also illustrated. On the wall 21, the position of the sections of the anti-skid tape 210 near the base of the curved edge 27 is shown.

Figure 19:
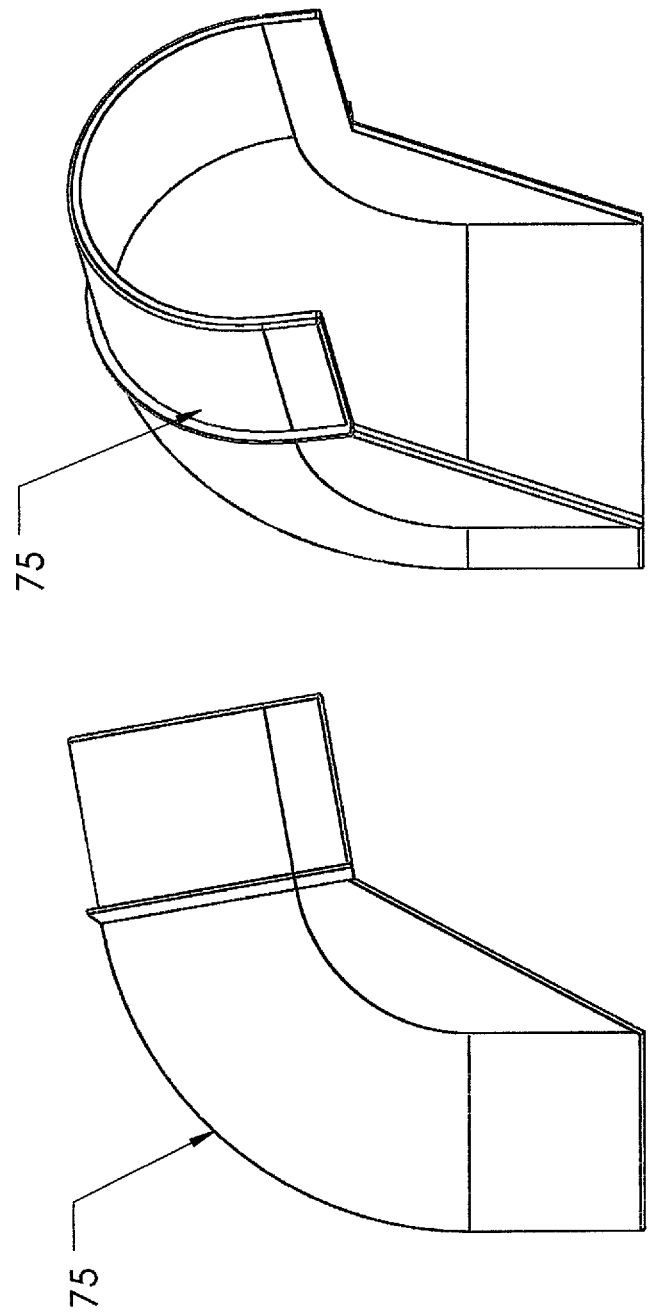
FIG. 19 is perspective view of the side of the elbow used to deflect air from the lid with curved edge of the fifth embodiment.

FIG. 19 is a perspective view of the side of the elbow 75 to divert air from the lid 120-B, for the fifth embodiment. The preferred angle of the elbow is 65 degrees, but it is also understood that it may be from 45 to 100 degrees. The figure shows the elongated sides and semicircular shape of the elbow 75. An elevation is present at the end of the elbow section that will be inserted into the opening of the pipe 29. This elevation increases the stability of the elbow when inserted into the pipe opening 29.

Figure 20:
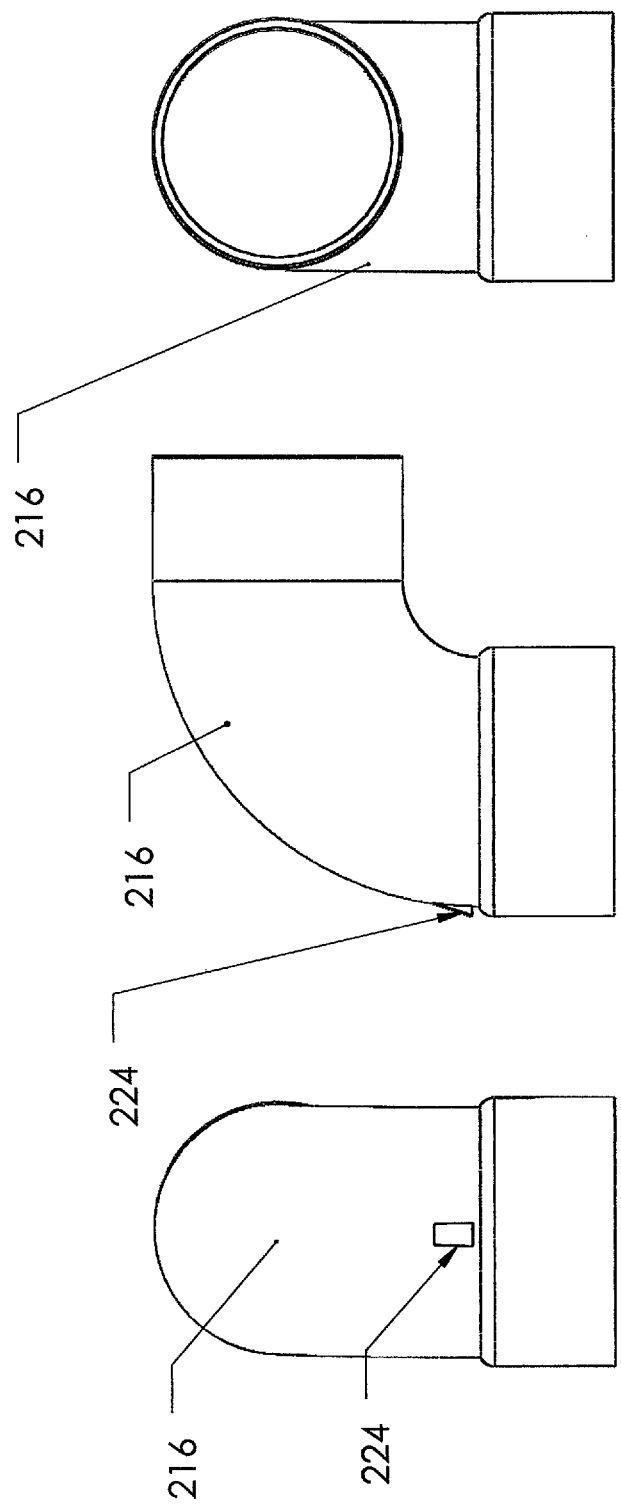
FIG. 20 is a view from different angles of the 90 degree elbow to the debris entrance of the lid with the curved edge of the fifth embodiment.

FIG. 20 is a view from different angles of 90 degree elbow 216 for the entrance of debris of lid 120-B, for the fifth embodiment and the first, second, third and fourth embodiments corresponding to the lids 200, 200-B, 200-C and 200-D. FIG. 20 shows in particular the shape and position of the small hook 224 to the rear of the elbow 216 to prevent removal of the elbow when it is inserted. The hook 224 is located just after the end of the female part of the elbow 216.

Operation of the Debris Collection System

To use the debris collection system 2 of the present invention (FIG. 9), the operator must first install the various components of the lid for the five embodiments described above.

For lids 200, 200-B, 200-C and 200-D, the operator must first place the sections of the self-adhesive anti-skid tape 210 on the wall 21 of the lid, at the bottom of the curved edge 27. Thereafter, on the underside of the lid, the operator inserts the two strainers 41 between the hooks 212.

For the lid 120-B, the operator must first put the handle on the top of the lid and on the wall 21, near the curved edge 27, the four elevations 228, in places indicated by the protrusions 9 on top of the lid. At the base of the curved edge 27, the operator places the four sections of self-adhesive anti-skid tape 210 between the elevations 228. Then, on the inside of the lid 120-B, the operator places both strainers 41 and the bolts through the holes 12 located around the strainers. Afterwards, the operator places the bolt 81 into one hole 20, the nearest to the center of the lid. The bolt 81 will keep the end of the elbow 216 in contact with the underside of the lid 120-B.

The following steps are similar for all the embodiments and are used for the lids 200, 200-B 200-C 200-D and 120-B (unless stated otherwise).

In the next step, the operator inserts the male part of the elbow 216 into the opening 206, through the top of lid up to the shoulder of the elbow (beginning of the female section), and inserts at the same time the end of the male part of the elbow 216 into the hook 214 or under the bolt head 81 (lid 120-B). The male section of the elbow 216 is then directed between the two strainers 41. This ensures directional stability of both elbows used for the entrance of debris and air.

The operator then proceeds with the installation of the ribbed coupling pipe 42 on the female section of the elbow 216. To do this, one opens the ribbed coupling pipe 42 slightly and one placed it over the female section of the elbow 216. Through the exterior face of the lid, the operator inserts the tail part of the two fasteners 34 through the openings 18 so that the head of each cable tie is a few centimeters above the lid. The cable tie 44-1 is then placed over the two fasteners 34, while passing under the heads of the fasteners 34. The cable tie 44-1 is then tightened against the ribbed coupling pipe 42, which bends the fasteners 34 to fit the groove of the ribbed coupling pipe 42 and at the same time adjusts the ribbed coupling pipe 42 to the female section of the elbow 216. Finally, the operator inserts another cable tie, similar to the first part of the cable tie inside the lid, on the part of the fastener 34 already inserted. One proceeds in the same manner for the second fastener 34. The excess of cable ties are removed so that they don't obstruct. The operator then installs the membrane 230 by inserting the ribbed coupling pipe 42 into the opening on the front part of the membrane 230. The membrane 230 will be perpendicular to the lid and under the bag 70 during operation of the debris collection system 2. Then the operator inserts the ribbed connecting pipe 6 into the ribbed coupling pipe 42. The ribbed connecting pipe 6 is inserted up to the female part of the elbow 216 so that the grooves and curvatures of the ribbed coupling pipe 42 and the ribbed connecting pipe 6 are superimposed one over the other, both being made of the same type of ribbed pipe. The cable tie 44-2 is placed in a groove of the ribbed coupling pipe 42, near the end, and surrounds the said ribbed coupling pipe 42. The cable tie 44-2 is then tightened strongly against the ribbed coupling pipe 42 which compresses the inside of the ribbed coupling pipe 42 onto the outside of the ribbed connecting pipe 6 and thus prevents the longitudinal movement, but allows the rotational movement of the ribbed connecting pipe 6 within the ribbed coupling pipe 42. This rotational movement allows for the adjustment of the position of the lid to the ground as well as the fan outlet 8 of the blower/vacuum 7 when the operator is moving or when replacing the bag 70.

The next step consists in the insertion of the ribbed connecting pipe 6 and the fan outlet 8 into the flexible plastic Poly Tubing coupling sleeve 60; the fan outlet 8 also enters into the ribbed connecting pipe 6 for a better hold. The two cable ties 58-1 and 58-2 are then placed around the Poly Tubing coupling sleeve 60 near the ends. Both cable ties are then tightened around the Poly Tubing coupling sleeve 60 to seal the joint and hold the ribbed connecting pipe 6 to the fan outlet 8 of the blower/vacuum 7. The cable tie 58-2 on the fan outlet 8 is placed behind the bulge of the fan outlet 8 for the blower/vacuum 7. The final steps are to insert the part of the lid in the opening of bag 70 to collect the debris and then to put the elastic cord 54 over the membrane 230 and the bag 70 between curved edge 27 and the elevations of 208 of the lid. The two hooks 56 of the elastic cord 54 are used to connect the two ends and to keep tension on the walls of the membrane 230 and the bag 70. In this position, the top of the lid is perpendicular to the walls of bag 70.

For the lid 120-B, the operator installs into the pipes of the opening 29 the two elbows 75 to direct the air outlet and directs the elbows to the desired angle.

Next, the operator activates the blower/vacuum 7 and proceeds with the vacuuming up of debris. The debris and the air sucked up are thrown out by the fan outlet 8 of the blower/vacuum 7 into the ribbed connecting pipe 6 and then into the lid 120 between the two strainers 41 or 40, up to the wall of the lid. From there, the debris is deflected laterally towards the bottom of the bag 70 for collection of the debris while the air flow brought in passes through the strainers 41 and goes out of the bag 70. The fast air flow between the two strainers 41 has the effect of preventing debris from adhering sufficiently to the domed surface of the strainers to negatively affect the air outlet. When the bag 70 begins to fill up, the operator lifts the lid by using the handle 204 or stops the blower/vacuum 7 and compresses the debris by pressing the side of the bag 70 in order to put in more debris. The operator restarts the blower/vacuum 7 and continues to collecting debris.

The operator can move around the field by sliding the bag on the ground without having to carry the weight of the debris. The membrane 230 under the bag protects and facilitates the sliding of the bag 70 on the ground. When the bag 70 is full, the operator stops the blower/vacuum 7, loosens the elastic cord 54 around the lid to remove the tension on the 70 bag, frees the bag 70 from the lid and slightly compresses the top of the bag 70 in order to have enough space to close the opening of the bag 70 with a tie or a knot. The debris remains in the collection bag 70 without having to pour it into another bag. The operator places a new bag 70 on the lid, installs the elastic cord 54, restarts the blower/vacuum 7 and can proceed rapidly to the work of collecting debris.

All kinds of bags can be used provided they are large enough to insert the lid in the opening of the bag 70. The type of bag can be sealed or not, plastic, paper or other material.

To store the blower/vacuum, the cable tie 58-2 which goes around the fan outlet 8 is removed which allows one to disconnect the ribbed connecting pipe 6 of the blower/vacuum 7. The debris collection system can then be stored in two parts, namely blower/vacuum 7 and the ribbed connecting pipe 6 with the lid and its various components.

Cable ties 58-2 and 44-2 can be provided with a release mechanism and are reusable or disposable, they must then be cut to be removed. These inexpensive cable ties are sold commercially and can be easily replaced by the operator.

We claim:

1. A lid with air outlet openings for leaves collection with a portable blower/vacuum and the rejection of debris into a bag, the lid is round shape with a flat or domed top with a lateral side with a curved 360-degree U-shaped edge which comprises: a) two rectangular openings with domed top and back for air outlet; b) a partially round opening with a flared U to allow debris in; c) a 90 degree elbow to allow debris in; d) a hook for holding the 90 degree elbow to the lid; e) hooks to hold two strainers for air filtration and retention of debris; f) an integrated handle molded with the lid; g) elevations to maintain in place a part of rectangular shape; h) elevations on the lateral side of the lid; i) sections of rough anti-skid tape; j) holes on top of the lid to maintain a ribbed coupling pipe to the lid with flexible plastic cable ties; k) reusable plastic cable ties to hold a ribbed connecting pipe in place.

2. The lid of claim 1 wherein the curved 360 degrees U-shape edge is made by the lateral side of the lid and the curvature of the extension of the wall folded towards the outside of the lid.

3. The lid of claim 2 wherein the curved U-shaped edge has inside, at regular intervals, side reinforcements to give more rigidity to the lid.

4. The lid of claim 1 wherein the lateral side is slightly flared towards the outside of the lid relative to the top of the lid.

5. The lid of claim 1 wherein the two rectangular openings for air outlet are an integral part of the lid, having been molded with the lid and of which the openings for air outlet are in a quadrant XY' and in a quadrant X'Y', which are delimited by a central axis YY' passing through the center of the opening to allow debris in and a central axis XX' passing through the center of the lid, the central axis XX' being perpendicular to the central axis YY'.

6. The lid of claim 5 wherein the center of the two openings for air outlet are at equal distances from the central axis YY'.

7. The lid of claim 5 wherein the center of the two openings for air outlet are at equal distances above the central axis XX' of the lid.

8. The lid of claim 5, wherein the two openings for air outlet have a domed top and back, and the sides inwardly, which are oriented at an angle of 90 degrees in relation to the central axis XX'.

9. The lid of claim 5, wherein the two openings for air outlet are oriented at an angle of 45 degrees in relation to the central axis XX'.

10. The lid of claim 5, wherein the two openings for air outlet are oriented in the same direction or in different directions in relation to the central axis YY'.

11. The lid of claim 1 wherein the opening to allow debris is in part round with a flared U-shaped extension, whose base is directed towards the center of the lid.

12. The lid of claim 1 wherein the 90 degree elbow is inserted into the opening to allow debris in, on either side of the lid, on a central axis YY' passing through the center of the lid and the center of the opening to allow debris in, the central axis YY' being perpendicular to a central axis XX' passing through the center of the lid.

13. The lid of claim 1 wherein the 90 degree elbow has a male end and a female end larger than the male end and of which the female end have a shoulder.

14. The lid of claim 13 wherein the 90 degree elbow has an elevation in its rear part close to the shoulder of the female part.

15. The lid of claim 13 wherein the male end of the 90 degree elbow is in contact with the inside of the lid and is directed towards the center of the lid.

16. The lid of claim 13 wherein the shoulder of the female end of the 90 degree elbow is in contact with the top of the lid.

17. The lid of claim 14 wherein the elevation in its rear part is in contact with the inside of the lid.

18. The lid of claim 1 wherein the 90 degree elbow is inclined towards the inner face of the lid at an angle of about 10 degrees.

19. The lid of claim 1 wherein a hook-shaped elevation is molded to the lid on a central axis YY' passing through the center of the lid and the center of the opening to allow debris in, the central axis YY' being perpendicular to a central axis XX' passing through the center of the lid.

20. The lid of claim 19 wherein the elevation is positioned so as to allow one to insert the hook in a male end of the 90 degree elbow.

21. The lid of claim 1 wherein the hooks are six in number, which are molded directly with the lid to hold the two strainers for air filtration and retention of debris.

22. The lid of claim 21 wherein the hooks are three in number for each strainer and wherein the end of the hook rests on the rigid edge of the strainer which is not in contact with the lid.

23. The lid of claim 21 wherein the hooks are placed at the periphery of the two strainers so as to form an isosceles triangle.

24. The lid of claim 21 wherein the hooks are placed in a circle wherein the center corresponds to the center of the rectangular openings for the air outlet.

25. The lid of claim 1 wherein the handle is rectangular in shape and is molded directly with the lid and wherein the center is on a central axis YY' passing through the center of the lid and the center of the opening to allow debris in, the central axis YY' being perpendicular to a central axis XX' passing through the center of the lid.

26. The lid of claim 25 wherein the base of the handle is perpendicular to the central axis YY' and is located above the center of the opening for the air outlet as opposed to the opening to allow debris in, which is below it.

27. The lid of claim 1 wherein elevations of rectangular or square shape are molded directly with the lid on the inside face of the lid.

28. The lid of claim 27 wherein the elevations are located on either side of the opening created in the lid to form the handle.

29. The lid of claim 1 wherein the part of rectangular shape has a small thickness, with or without holes, and is placed on the inside of the lid between the elevations located on each side of the handle.

30. The lid of claim 29 wherein a portion of the part of rectangular shape is under the rigid edge of the two strainers for air filtration.

31. The lid of claim 1 wherein the elevations are four in number, which are molded directly with the lid on the lateral side of the lid so as to retain an elastic cord.

32. The lid of claim 31 wherein the elevations on the lateral side are arranged at equal distances and at an angle of 45 degrees on either side of a central axis YY' passing through the center of the lid and the center of the opening to allow debris in, the central axis YY' being perpendicular to a central axis XX' passing through the center of the lid.

33. The lid of claim 31 wherein the elevations are placed close to the curved edge of the lid.

34. The lid of claim 1 wherein the sections of rough anti-skid tape are four in number, which are glued on the lateral side of the lid at the lower end of the 360 degrees curved edge and between the elevations on the lateral side of the lid.

35. The lid of claim 1 wherein two holes are placed on each side of the opening to allow debris in on an axis which passes through the center of the round part of the opening to allow debris in and which is parallel to a central axis XX' passing through the center of the lid and which is perpendicular to a central axis YY' passing through the center of the lid and the center of the opening to allow debris in.

36. The lid of claim 35 wherein flexible plastic cable ties are inserted into the two holes so as to maintain the ribbed coupling pipe.

37. A lid with air outlet openings for leaves collection with a portable blower/vacuum and the rejection of debris into a bag, the lid is round shape with a flat or domed top with a lateral side with a curved 360-degree U-shaped edge which comprises: a) reinforcements in the curved edge; b) sections of rough anti-skid tape; c) elevations on the lateral side of the lid; d) two pipes for the air outlet each having a removable air deflector; e) an opening to allow debris in; f) a 90 degree elbow to allow debris in; g) two strainers for air filtration and retention of debris; h) a rigid handle attached with two screws; i) holes on to of the lid to attach the 90 degree elbow, the two strainers, a ribbed coupling pipe and the rigid handle; j) rigid bolts to hold the strainers and the 90 degree elbow.

38. The lid of claim 37 wherein the curved 360 degree U-shaped edge is made by the lateral side of the lid and by the curvature of the extension of the wall folded toward the outside of the lid.

39. The lid of claim 38 wherein the U-shaped curved edge has within, at regular intervals, the reinforcements to give more rigidity to the lid.

40. The lid of claim 37 wherein the lateral side is slightly flared to the outside of the lid in relation to the top of the lid.

41. The lid of claim 37 wherein the sections of rough anti-skid tape are glued to the lateral side at the lower limit of the curved edge over 360 degrees.

42. The lid of claim 37 wherein the elevations on the lateral side are glued near of the curved edge.

43. The lid of claim 42 wherein the elevations on the lateral side are arranged at an angle of 45 degrees in relation to a central axis XX' passing through the center of the lid, the central axis XX' being perpendicular to a central axis YY' passing through the center of the lid and the center of the opening to allow debris in.

44. The lid of claim 42 wherein the elevations are placed near the curved edge of the lid and between the discontinuous sections of rough anti-skid tape.

45. The lid of claim 37 wherein the removable air deflectors are inserted into each of the two air outlet pipes.

46. The lid of claim 45 wherein the removable deflectors consist of a half-elbow cut longitudinally in their center in the lateral line perpendicular to the curvature of the elbow and wherein the curvature angle is between 45 and 100 degrees.

47. The lid of claim 46 wherein the curvature angle is 65 degrees.

48. The lid of claim 46 wherein the outer diameter of a half-elbow is larger than the inside diameter of a pipe for air outlet.

49. The lid of claim 46 wherein the half-elbow has an external swelling near one end.

50. The lid of claim 46 wherein the half-elbow is inserted into the external swelling inside the air outlet pipe by inwardly compressing the outside edges of the half-elbow while not exceeding the limit of elasticity of the plastic.

51. The lid of claim 50 wherein the half-elbow is held in place by the friction created between the outer wall of the half-elbow and the inner wall of the air outlet pipe.

52. The lid of claim 37 wherein opening for the entrance of the round lid is in part with a U-shaped extension whose base is flared towards the center of the lid.

53. The lid of claim 37 wherein the 90 degree elbow is inserted into the opening for the entrance of debris, on either side of the lid, along a central axis YY' of the lid passing through the center of the lid and the center of the opening to allow debris in, the central axis YY' being perpendicular to a central axis XX' passing through the center of the lid.

54. The lid of claim 37 wherein the 90 degree elbow has a male end and a female end larger than the male end.

55. The lid of claim 54 wherein the male end of the 90 degree elbow is in contact with the inner face of the lid and is oriented towards the center of the lid.

56. The lid of claim 54 wherein the female end of the 90 degree elbow has a shoulder which is in contact with the top of the lid.

57. The lid of claim 37 wherein the 90 degree elbow is inclined towards the inner face of the lid at an angle of about 10 degrees.

58. The lid of claim 37 wherein two holes are used to attach the rigid handle between the center of the two air outlet pipes and the edge of the lid and of which the two holes are on a central axis YY' passing through the center of the lid and the center of the opening to allow debris in, the central axis YY' being perpendicular to a central axis XX' passing through the center of the lid.

59. The lid of claim 37 wherein the rigid handle is attached to the top of the lid with the two screws inserted from the inside of the lid.

60. The lid of claim 37 wherein the two strainers are attached to the lid with flat rigid head bolts wherein a head rests on the rigid edge of the strainers and the other head on top of the lid.

61. The lid of claim 60 wherein the bolts are inserted into the holes placed concentrically relative to the center of the opening for the air outlet.

62. The lid of claim 60 wherein the bolts are made of two distinct parts which are inserted one into the other by pressure or by screwing when there are threads.

63. The lid of claim 62 wherein a portion of the bolt is inserted through the top of the lid and the other part through the bottom of the lid.

64. The lid of claim 37 wherein a bolt is inserted into the hole near the end of the male end of the 90 degree elbow.

65. The lid of claim 64 wherein one of the heads of the bolt rests on the inside of the male end of the 90 degree elbow and the other head on top of the lid.

66. The lid of claims 1 and 37 wherein the round lid is inserted into the opening of a plastic bag or other plastic material and wherein the bag is held around the lid with an elastic cord placed over the edge of the bag.

67. The lid of claim 66 wherein a membrane used to protect the debris collection bag is placed between the bag and the elastic cord.

68. The lid of claims 1 and 37 wherein a small thick plastic membrane is glued to the lateral side of the lid, which is located opposite to the opening for the entrance of debris and wherein a portion of the membrane extends towards the inside of the debris collection bag.

69. The lid of claims 1 and 37 wherein a drainage pipe section is used as pipe for conveying and feeding the debris from the blower/vacuum to the debris collection bag.

70. The lid of claims 1 and 37 wherein a drainage pipe section is used as a joint between the 90 degree elbow and the pipe for conveying and feeding the debris from the blower/vacuum towards the debris collection bag.

* * * * *